United States Patent
Saito

(10) Patent No.: US 9,579,872 B2
(45) Date of Patent: Feb. 28, 2017

(54) GLUING DEVICE

(71) Applicant: KABUSHIKI KAISHA ISOWA, Nagoya-shi, Aichi (JP)

(72) Inventor: Hiroshi Saito, Kasugai (JP)

(73) Assignee: KABUSHIKI KAISHA ISOWA, Aichi (JP)

( * ) Notice: Subject to any disclaimer, the term of this patent is extended or adjusted under 35 U.S.C. 154(b) by 26 days.

(21) Appl. No.: 14/819,944

(22) Filed: Aug. 6, 2015

(65) Prior Publication Data
US 2016/0052249 A1 Feb. 25, 2016

(30) Foreign Application Priority Data

Aug. 19, 2014 (JP) .................................. 2014-166810

(51) Int. Cl.
B29C 65/52 (2006.01)
B32B 37/12 (2006.01)
(Continued)

(52) U.S. Cl.
CPC ........ B32B 37/0053 (2013.01); B05C 1/0813 (2013.01); B05C 1/16 (2013.01);
(Continued)

(58) Field of Classification Search
USPC ........ 156/538, 539, 543, 547, 578; 118/200, 118/209, 256, 258, 262
See application file for complete search history.

(56) References Cited

U.S. PATENT DOCUMENTS 462,631 A * 11/1891 Draper .................... F28F 27/00
  12/128 F
3,864,185 A * 2/1975 Johnson ................ B31F 1/2818
  156/208
(Continued)

FOREIGN PATENT DOCUMENTS

JP 4-94433 U 8/1992
JP 08258187 A * 10/1996
(Continued)

OTHER PUBLICATIONS

English Abstract of JP 08-258187 (Oct. 26, 2016).*
(Continued)

*Primary Examiner* — Sing P Chan
(74) *Attorney, Agent, or Firm* — Brinks Gilson & Lione

(57) ABSTRACT

Disclosed is a gluing device including a reservoir tank of liquid glue; an applicator roll partially immersed in the liquid glue; a doctor roll for adjusting a thickness of the liquid glue adhered to the applicator roll to become uniform; and a pair of glue dams for regulating a width of the liquid glue adherable to the applicator roll. The gluing device is configured to apply the adhered liquid glue on the applicator roll to a corrugated medium of a corrugated paperboard sheet. Each of the glue dams includes a pair of dam units located in spaced-apart relation to each other in a width direction of the applicator roll. The pair of dam units are configured to form a glue-uncoated region interposed between the pair of dam units on an outer peripheral surface of the applicator roll so as to correspond to a trimming region of the corrugated paperboard sheet.

8 Claims, 12 Drawing Sheets

(51) Int. Cl.
*B32B 39/00* (2006.01)
*B32B 37/00* (2006.01)
*B05C 1/08* (2006.01)
*B32B 7/12* (2006.01)
*B32B 29/00* (2006.01)
*B32B 3/28* (2006.01)
*B05C 1/16* (2006.01)
*B31F 1/28* (2006.01)

(52) U.S. Cl.
CPC ........... *B31F 1/2818* (2013.01); *B32B 3/28* (2013.01); *B32B 7/12* (2013.01); *B32B 29/005* (2013.01); *B32B 37/1292* (2013.01); *B05C 1/0834* (2013.01); *B32B 2250/26* (2013.01); *B32B 2255/12* (2013.01)

(56) References Cited

U.S. PATENT DOCUMENTS

| | | | | | |
|---|---|---|---|---|---|
| 3,892,613 | A | * | 7/1975 | McDonald | B31F 1/2804 156/205 |
| 3,922,129 | A | * | 11/1975 | McDonald | B31F 1/2872 156/470 |
| 3,936,549 | A | * | 2/1976 | Kohler | B05C 1/12 118/259 |
| 3,973,475 | A | * | 8/1976 | Nigrosh | B31B 1/62 493/145 |
| 3,973,516 | A | * | 8/1976 | Minkow | B27G 11/00 118/262 |
| 4,119,057 | A | * | 10/1978 | Wahnschaff | B31B 1/62 101/363 |
| 4,162,182 | A | * | 7/1979 | Wesley | B65C 1/047 156/212 |
| 4,262,626 | A | * | 4/1981 | Wahnschaff | B05C 13/00 118/247 |
| 4,263,869 | A | * | 4/1981 | Wahnschaff | B05C 1/025 118/203 |
| 4,287,008 | A | * | 9/1981 | Torok | C23C 2/28 148/503 |
| 4,316,755 | A | * | 2/1982 | Flaum | B05C 1/0813 118/259 |
| 4,343,259 | A | * | 8/1982 | McConnel | D06B 1/14 118/126 |
| 4,351,264 | A | * | 9/1982 | Flaum | B05C 1/0813 101/351.8 |
| 4,406,251 | A | * | 9/1983 | Neri | B26D 5/34 118/212 |
| 4,461,665 | A | * | 7/1984 | Schertler | B21D 47/00 156/210 |
| 4,500,381 | A | * | 2/1985 | Nordstrom | B31F 1/2813 156/205 |
| 4,521,271 | A | * | 6/1985 | Voltmer | B65C 3/12 156/568 |
| 4,549,924 | A | * | 10/1985 | Berthelot | B31F 1/2818 118/204 |
| 4,603,654 | A | * | 8/1986 | Mori | B31F 1/2818 118/202 |
| 4,617,076 | A | * | 10/1986 | Jones, Jr. | B31F 1/2818 118/248 |
| 4,655,870 | A | * | 4/1987 | Mori | B31F 1/2818 156/208 |
| 4,657,622 | A | * | 4/1987 | Paules | B65C 1/025 156/351 |
| 4,693,774 | A | * | 9/1987 | Wesley | B65C 3/12 156/212 |
| 4,710,257 | A | * | 12/1987 | Mattei | B65B 51/026 118/211 |
| 4,802,440 | A | * | 2/1989 | Kronseder | B65C 9/2269 118/126 |
| 4,886,563 | A | * | 12/1989 | Bennett | B31F 1/2813 156/205 |
| 5,071,507 | A | * | 12/1991 | Birke | B31F 1/2818 156/470 |
| 5,101,761 | A | * | 4/1992 | Isowa | B05C 1/0813 118/249 |
| 5,145,549 | A | * | 9/1992 | Mosburger | B31F 1/2854 118/65 |
| 5,155,320 | A | * | 10/1992 | Simmons | B23K 35/0205 219/119 |
| 5,167,749 | A | * | 12/1992 | Kasak | B65C 3/12 156/446 |
| 5,443,639 | A | * | 8/1995 | Hawkes | B05C 1/006 118/110 |
| 5,588,945 | A | * | 12/1996 | Lauderbaugh | B31F 1/2854 156/473 |
| 5,628,868 | A | * | 5/1997 | Marschke | B05C 1/0817 118/261 |
| 5,766,410 | A | * | 6/1998 | Wu | B31F 1/2877 156/470 |
| 5,794,812 | A | * | 8/1998 | Walsh | B31B 7/00 229/117.27 |
| 5,876,530 | A | * | 3/1999 | Seki | B31F 1/2818 118/258 |
| 6,068,701 | A | * | 5/2000 | Kohler | B05C 1/0817 118/119 |
| 6,139,938 | A | * | 10/2000 | Lingle | B31F 1/28 156/205 |
| 6,221,192 | B1 | * | 4/2001 | Walsh | B26D 7/18 156/252 |
| 6,800,052 | B1 | * | 10/2004 | Abe | B31F 1/2863 492/34 |
| 7,832,441 | B2 | * | 11/2010 | Titz | B31F 1/2818 156/202 |
| 2002/0061241 | A1 | * | 5/2002 | Fischer | B42C 9/0012 412/37 |
| 2002/0071937 | A1 | * | 6/2002 | Smith | B31F 1/2886 428/182 |
| 2003/0131926 | A1 | * | 7/2003 | Smitterberg | B31F 1/2818 156/210 |
| 2006/0156974 | A1 | * | 7/2006 | Muller-Lorenschat | B42C 9/0012 118/261 |
| 2007/0297833 | A1 | * | 12/2007 | Nishida | G03G 15/0812 399/284 |
| 2008/0003082 | A1 | * | 1/2008 | Motoshima | H01L 21/6734 414/217.1 |
| 2008/0317940 | A1 | * | 12/2008 | Kohler | B31F 1/2818 427/8 |
| 2009/0117376 | A1 | * | 5/2009 | Bloembergen | B05C 1/0813 428/341 |
| 2010/0209215 | A1 | * | 8/2010 | Sasamoto | B05C 1/003 412/37 |
| 2015/0174606 | A1 | * | 6/2015 | Tang | B05D 1/02 427/261 |
| 2015/0290899 | A1 | * | 10/2015 | Ohira | B31F 5/04 156/470 |
| 2015/0360436 | A1 | * | 12/2015 | Ohira | B31F 1/24 156/250 |

FOREIGN PATENT DOCUMENTS

| | | | |
|---|---|---|---|
| JP | 9-262790 A | | 10/1997 |
| JP | 10029251 A | * | 2/1998 |
| JP | 10156975 A | * | 6/1998 |
| JP | 2000254987 A | * | 9/2000 |
| JP | 2004155021 A | * | 6/2004 |
| JP | 2004167355 A | * | 6/2004 |
| JP | EP 1757548 A1 | * | 2/2007 ........... B31F 1/2836 |
| JP | 2010269559 A | * | 12/2010 |

OTHER PUBLICATIONS

English Abstract of JP 10-029251 (Oct. 26, 2016).*
English Abstract of JP 10-156975 (Oct. 26, 2016).*
English Abstract of JP 2000-254987 (Oct. 26, 2016).*
English Abstract of JP 2004-155021 (Oct. 26, 2016).*
English Abstract of JP 2004-167355 (Oct. 26, 2016).*

(56) References Cited

OTHER PUBLICATIONS

English Abstract of JP 2010-269559 (Oct. 26, 2016).*

* cited by examiner

GLUING DEVICE

RELATED APPLICATIONS

This application claims priority under 35 U.S.C. §119 to Japanese Patent Application No. 2014-166810 filed on Aug. 19, 2014, the entire content of which is hereby incorporated by reference.

BACKGROUND OF THE INVENTION

1. Field of the Invention

The present invention relates to a gluing device, and more particularly to a gluing device usable in a corrugating machine for producing a corrugated paperboard sheet.

2. Description of the Related Art

Generally, a corrugating machine is designed to continuously produce a plurality of corrugated paperboard sheets from raw paperboards such as a corrugated medium and a linerboard. For this purpose, the corrugating machine is equipped with a gluing device for gluing or bonding a corrugated medium and a linerboard together. Examples of this type of gluing device include a gluing device used in a gluing machine to apply liquid glue to flute tip regions of a corrugated medium in a single-faced corrugated paperboard sheet in which the corrugated medium is bonded onto a planar linerboard.

The gluing device of the gluing machine comprises: a reservoir tank storing therein liquid glue; an applicator roll partially immersed in the liquid glue stored in the reservoir tank; a doctor roll for adjusting a thickness of the liquid glue adhered to the applicator roll to become uniform; and a pair of glue dams for regulating a width of the liquid glue adherable to the applicator roll. When the gluing device of the gluing machine is used in a situation where a width of a single-faced corrugated paperboard sheet used is greater than a width of a front linerboard, flute tip regions of a corrugated medium applied with the liquid glue are exposed in widthwise opposite edge regions of the single-faced corrugated paperboard sheet, thereby causing a problem that the liquid glue is wastefully used, and the exposed liquid glue adheres to a downstream-side heating plate.

With a view to solving this problem, for example, JP-U 04-094433A (Patent Document 1) discloses a gluing device for a gluing machine, wherein a pair of glue dams each movable in a width direction of a corrugated paperboard sheet are provided in a reservoir tank of the gluing device to thereby allow a transfer and supply width of liquid glue to be arbitrarily set in a variable manner, correspondingly to an effective crosswise width of a corrugated paperboard sheet to be produced.

Meanwhile, after the gluing, the resulting glued corrugated paperboard sheet is cut (slit) into a given width along a sheet feeding direction (machine direction) by a slitter apparatus disposed downstream of the gluing machine. The corrugated paperboard sheet after passing through the slitter apparatus is cut into a given cut length by a cutter apparatus disposed downstream of the slitter apparatus. A plurality of corrugated paperboard sheets cut by the cutter apparatus are sequentially stacked up to a given height by a stacker disposed on a downstreammost side of the corrugating machine.

In this process, a strip-shaped cutting scrap (hereinafter referred to as "trimming strip") is formed along each of opposite edges of a corrugated paperboard sheet after passing through the slitter apparatus, because a width of an initial or original corrugated paperboard sheet is set to be greater than a cut width of the slitter apparatus. As illustrated in FIG. 12, such trimming strips 101 are sucked and collected by a suction duct 102 disposed along and downstream of a slitter apparatus 100. However, an increase in width dimension of each of the trimming strips 101 causes a problem that jamming-up (clogging) is more likely to occur inside the suction duct or around an inlet of the suction duct.

With a view to solving this problem, for example, JP 09-262790A (Patent Document 2) discloses a slitter apparatus, wherein, when a width of each trimming strip is greater than a given value, a cutting center of the slitter apparatus is offset in such a manner that a relatively narrow trimming strip and a relatively wide trimming strip are formed, respectively, in one of opposite edge regions of a corrugated paperboard sheet and in the other edge region, and wherein, when the relatively wide trimming strip has a width equal to or less than a given value, the relatively wide trimming strip is further narrowly cut, and then sucked and collected by the suction duct.

SUMMARY OF THE INVENTION

[Technical Problem]

However, in the gluing device disclosed in the Patent Document 1, if a plurality of production orders for narrow-type corrugated paperboard sheets having a relatively small width continues, there is no opportunity of moving the glue dams to the respective widthwise opposite ends of the applicator roll, so that, for example, the adhered liquid glue around the widthwise opposite ends of the applicator roll is likely to be dried and firmly adhered to a surface of the applicator roll in the form of solid glue. Thus, there is a problem that, when a wide-type corrugated paperboard sheet necessary to use approximately the entire width of the applicator roll is subsequently produced, uniform glue application becomes difficult.

Further, in the slitter apparatus disclosed in the Patent Document 1, even each of the trimming strips obtained by narrowly cutting the relatively wide trimming strip having a width equal to or less than a given value has still high rigidity, because it is composed of a corrugated medium and front and back linerboards bonded thereto. Thus, there is a problem that the trimming strips are entangle with each other around the inlet of the suction duct, without being smoothly sucked into the suction duct, resulting in the occurrence of jamming-up.

The present invention has been made with a view to solving the above problems, and an object of the present invention is to provide a gluing device capable of preventing wasteful use of liquid glue and adhesion of glue to a downstream-side heating plate, while reducing firm adhesion of glue to an applicator roll, and easily collecting and treating trimming strips in opposite edge regions of a corrugated paperboard sheet, through a suction duct.

[Solution to Technical Problem]

(1) In order to achieve the above object, the present invention provides a gluing device which comprises: a reservoir tank storing therein liquid glue; an applicator roll partially immersed in the liquid glue stored in the reservoir tank; a doctor roll for adjusting a thickness of the liquid glue adhered to the applicator roll to become uniform; and a pair of glue dams for regulating a width of the liquid glue adherable to the applicator roll, wherein the gluing device is configured to apply the adhered liquid glue on the applicator roll to a corrugated medium of a corrugated paperboard sheet, and wherein each of the glue dams comprises a pair of dam units located in spaced-apart relation to each other in a width direction of the applicator roll, and wherein the pair of dam units are configured to form a glue-uncoated region interposed between the pair of dam units on an outer peripheral surface of the applicator roll so as to correspond to a trimming region along each of opposite edges of the corrugated paperboard sheet.

In the gluing device having this feature, an amount of the liquid glue to be applied to the trimming regions can be reduced or minimized. In addition, the glue-uncoated region is formed while being interposed between the pair of dam units, so that sealability between the outer peripheral surface of the applicator roll and each of the dam units is enhanced, and it becomes easier to prevent the glue-uncoated region from being adherently coated with the liquid glue. This makes it possible to prevent wasteful use of the liquid glue and adhesion of glue to a downstream-side heating plate.

Further, the glue-uncoated region is formed correspondingly to the trimming regions along the respective opposite edges of the corrugated paperboard sheet, to reduce or minimize the amount of the liquid glue to be applied to the trimming regions, so that it becomes possible to reduce or limit a bonding area between a linerboard and the corrugated medium in the trimming regions, to the minimum. Therefore, rigidity of trimming strips trimmed by a slitter apparatus disposed downstream of the gluing device in a sheet feeding direction (machine direction) is reduced. This makes it possible to more easily suck and collect the trimming strips by a suction duct, and reduce the occurrence of an undesirable situation where the trimming strips are entangle with each other around an inlet of the suction duct, causing jamming-up.

On the other hand, the liquid glue adheres to and coats a region of the outer peripheral surface of the applicator roll other than the glue-uncoated region in the width direction of the applicator roll. Thus, for example, even in the case where a narrow-type corrugated paperboard sheet is continuously produced, it becomes possible to reduce the occurrence of an undesirable situation where the adhered liquid glue at opposite ends of the applicator roll is dried and firmly adhered to the surface of the applicator roll. This makes it possible to perform uniform glue application even when a wide-type corrugated paperboard sheet necessary to use approximately the entire width of the applicator roll is subsequently produced.

As above, the gluing device of the present invention can prevent wasteful use of the liquid glue and adhesion of glue to the downstream-side heating plate, while reducing firm adhesion of glue to the applicator roll, and easily collect and treat trimming strips in opposite edge regions of the corrugated paperboard sheet.

(2) Preferably, in the gluing device of the present invention, each of the glue dams comprises a movable member movable in the width direction of the applicator roll, and the pair of dam units are coupled to the movable member.

In the gluing device having this feature, the glue-uncoated region of the applicator roll which is interposed between the pair of dam units can be shifted to an arbitrary position in the width direction of the applicator roll. Thus, when a cut width of the corrugated paperboard sheet is changed correspondingly to a production order, the glue-uncoated region can be adjusted correspondingly to new trimming regions, only by moving the movable members to respective positions corresponding to a new cut width. As used herein, the term "cut width of the corrugated paperboard sheet" means a value derived by multiplying a slit width, i.e., a width (span) between adjacent slits to be cut by a slitter apparatus (slitter-scorer apparatus) disposed downstream of the gluing device in the sheet feeding direction of the corrugated paperboard sheet, by a width-span number, i.e., the number of the spans of width for the number of paperboard sheets to be manufactured.

This makes it possible to cope with a change in cut width of the corrugated paperboard sheet according to a production order, in addition to the advantage of being able to prevent wasteful use of the liquid glue and adhesion of glue to the downstream-side heating plate, while reducing firm adhesion of glue to the applicator roll, and easily collect and treat trimming strips in the opposite edge regions of the corrugated paperboard sheet.

(3) Preferably, in the gluing device of the present invention, each of the glue dams comprises a pair of movable members each movable in the width direction of the applicator roll, and the pair of dam units are coupled to the pair of movable members, respectively.

In the gluing device having this feature, the glue-uncoated region of the applicator roll which is interposed between the pair of dam units can be shifted to an arbitrary position in the width direction of the applicator roll. Thus, when the cut width of the corrugated paperboard sheet is changed correspondingly to a production order, a position and a width of the glue-uncoated region can be adjusted correspondingly to new trimming regions, only by moving the movable members to respective desired positions corresponding to a new cut width.

This makes it possible to more accurately cope with a change in cut width of the corrugated paperboard sheet according to a production order, in addition to the advantage of being able to prevent wasteful use of the liquid glue and adhesion of glue to the downstream-side heating plate, while reducing firm adhesion of glue to the applicator roll, and easily collect and treat trimming strips in the opposite edge regions of the corrugated paperboard sheet.

(4) Preferably, in the above gluing device, the pair of dam units in each of the glue dams consist of a first dam unit disposed on an inner side of the applicator roll along the width direction of the applicator roll, and a second dam unit disposed on an outer side of the applicator roll along the width direction of the applicator roll, wherein the first dam unit is disposed so as to correspond to a cut position along which the trimming region of the corrugated paperboard sheet is to be cut, and the second dam unit is disposed so as to correspond to a position of an original edge of the corrugated medium of the corrugated paperboard sheet.

In the gluing device having this feature, a width dimension of the glue-uncoated region can be adjusted correspondingly to a width dimension of the trimming regions along the respective opposite edges of the corrugated paperboard sheet. Thus, it becomes possible to minimize an amount of the liquid glue to be applied to the trimming regions to thereby further reliably prevent wasteful use of the liquid glue and adhesion of glue to the downstream-side heating plate.

In addition, the minimization of the amount of the liquid glue to be applied to the trimming regions allows the bonding area between the corrugated medium and a linerboard in the trimming regions to be limited to the minimum. Therefore, rigidity of the trimming strips is significantly reduced, so that it becomes possible to further reduce the occurrence of the undesirable situation where the trimming strips are entangle with each other around the inlet of the suction duct, causing jamming-up.

This makes it possible to reliably prevent wasteful use of the liquid glue and adhesion of glue to the downstream-side heating plate, and easily collect and treat the trimming strips in the opposite edge regions of the corrugated paperboard sheet.

(5) Preferably, in the above gluing device, the pair of dam units in each of the glue dams consist of a first dam unit disposed on an inner side of the applicator roll along the width direction of the applicator roll, and a second dam unit disposed on an outer side of the applicator roll along the width direction of the applicator roll, wherein, when a value derived by subtracting a cut width of the corrugated paperboard sheet from an original width of the corrugated medium of the corrugated paperboard sheet is less than a given value, the first dam unit is disposed so as to correspond to a cut position along which the trimming region of the corrugated paperboard sheet is to be cut, and the second dam unit is disposed so as to correspond to a minimum distance to which the second dam unit is allowed to come close to the first dam unit.

In the gluing device having this feature, the glue-uncoated region of the applicator roll is limited to a minimum range in which the two dam units are allowed to come close to each other, thereby avoiding the firm adhesion of glue, while ensuring gluing of a corrugated paperboard sheet to be formed as a product. This makes it possible to prevent wasteful use of the liquid glue and adhesion of glue to the downstream-side heating plate, to the minimum extent.

In addition, this arrangement is taken when a value derived by subtracting a cut width of the corrugated paperboard sheet from an original width of the corrugated medium of the corrugated paperboard sheet is less than a given value, so that a width dimension of the trimming region is equal to or less than the minimum distance to which the two dam units are allowed to come close to each other, and thus the liquid glue is adhered only in a vicinity of a cut edge of each of the trimming strips. Thus, it becomes possible to relatively reduce the occurrence of an undesirable situation where the trimming strips are entangle with each other around the inlet of the suction duct, causing jamming-up.

As above, it becomes possible to prevent wasteful use of the liquid glue and adhesion of glue to the downstream-side heating plate, and easily collect and treat the trimming strips in the opposite edge regions of the corrugated paperboard sheet.

(6) Preferably, the above gluing device is provided in a gluing machine, and each of the pair of movable members in each of the glue dams is configured to move a respective one of the first dam unit and the second dam unit, based on a changeover signal output from a production management device of a corrugating machine comprising the gluing machine.

In the gluing device having this feature, position control of the first and second dam units can be performed interlockingly with a production order for corrugated paperboard sheets set up in the corrugating machine. Thus, it becomes possible to move the first and second dam units to respective adequate positions in synchronization with a timing of changeover of production order.

This makes it possible to minimize line stopping during changeover of production order, while preventing wasteful use of the liquid glue and adhesion of glue to the downstream-side heating plate, and easily collecting and treating the trimming strips in the opposite edge regions of the corrugated paperboard sheet.

(7) Preferably, in the above gluing device, the glue dams are disposed in asymmetric relation with respect to a center line of the corrugated paperboard sheet in a sheet feeding direction.

In the gluing device having this feature, even when the trimming regions along the opposite edges of the corrugated paperboard sheet are cut in an asymmetric manner, the glue-uncoated region can be formed correspondingly to the asymmetric trimming regions. Thus, a width dimension of the glue-uncoated region can be adjusted correspondingly to a width dimension of the asymmetric trimming regions along the opposite edges of the corrugated paperboard sheet.

This makes it possible to minimize the amount of the liquid glue to be applied to the trimming regions, even to the asymmetric trimming regions, thereby further reliably preventing wasteful use of the liquid glue and adhesion of glue to the downstream-side heating plate.

DETAILED DESCRIPTION OF THE PREFERRED EMBODIMENTS

With reference to the drawings, a gluing device according to one embodiment of the present invention will now be described in detail. In the following description, as regards this embodiment, a general structure of the gluing device equipped in a gluing machine will be described, and then a detailed structure of a glue dam in the gluing device and a glue-uncoated region to be formed on an applicator roll in the gluing device will be described. Subsequently, details of glue dam control will be described in relationship with a production management device of a corrugating machine.

<General Structure of Gluing Device>

First of all, as regards this embodiment, a general structure of the gluing device used in a gluing machine will be described based on FIGS. 1 and 2.

Figure 1:
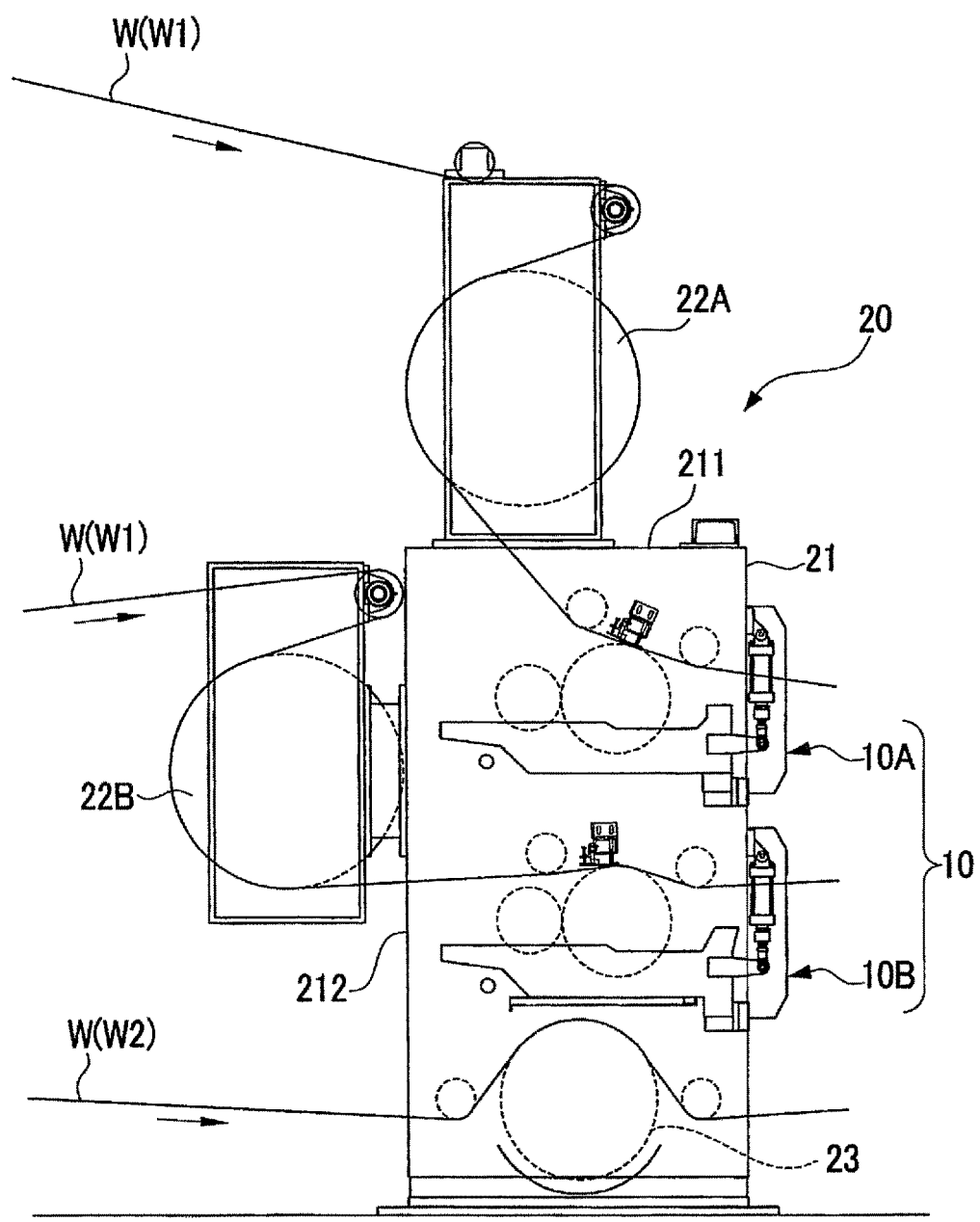
FIG. 1 is a schematic side view illustrating a gluing machine equipped with a gluing device according to one embodiment of the present invention.

FIG. 1 is a side view of a gluing machine equipped with the gluing device according to this embodiment. FIG. 2 is a side view illustrating the gluing device in FIG. 1.

As illustrated in FIG. 1, the gluing machine 20 comprises a housing 21 having an approximately rectangular shape in side view, and two gluing devices 10, 10 (10A, 10B) disposed inside the housing 21 in spaced-apart relation in an up-down direction. One preheater 22A for heating a single-faced corrugated paperboard sheet W (W1) to be fed to the upper gluing device 10A, before applying glue to the single-faced corrugated paperboard sheet W (W1), and one preheater 22B for heating a single-faced corrugated paperboard sheet W (W1) to be fed to the lower gluing device 10B, before applying glue to the single-faced corrugated paperboard sheet W (W1), are also provided, respectively, on a top wall 211 of the housing 21 and on an upstream-side lateral wall 212 of the housing 21.

Further, one preheater 23 for heating a front linerboard W (W2) to be bonded (glued) to a single-faced corrugated paperboard sheet W (W1), before the bonding, is provided just below the gluing devices 10 inside the housing 21.

In this gluing machine, the two gluing devices 10 (10A, 10B) are used in the following two different ways depending on types of a corrugated paperboard sheet W: one case where only one of them is used; and the other case where both of them are used. For example, in the case where liquid glue is applied to flute tip regions of a corrugated medium W1 of a single-faced corrugated paperboard sheet W, and a front linerboard W (W2) is bonded to the glue-applied flute tip regions to produce a double-faced corrugated paperboard sheet, one of the upper and lower gluing devices 10 is used. On the other hand, in the case where, after liquid glue is applied to flute tip regions of respective corrugated mediums W1 of two single-faced corrugated paperboard sheets W, one of the two single-faced corrugated paperboard sheets W is bonded to the glue-applied flute tip regions of the other single-faced corrugated paperboard sheet W, and then a front linerboard W2 is bonded to the glue-applied flute tip regions of the one single-faced corrugated paperboard sheet W to produce a double-walled corrugated paperboard sheet, both of the upper and lower gluing devices 10 are used. Basically, the upper and lower gluing devices 10 are structurally the same. Thus, details of the structure will be described by taking the upper gluing device 10A as a representative example.

Figure 2:
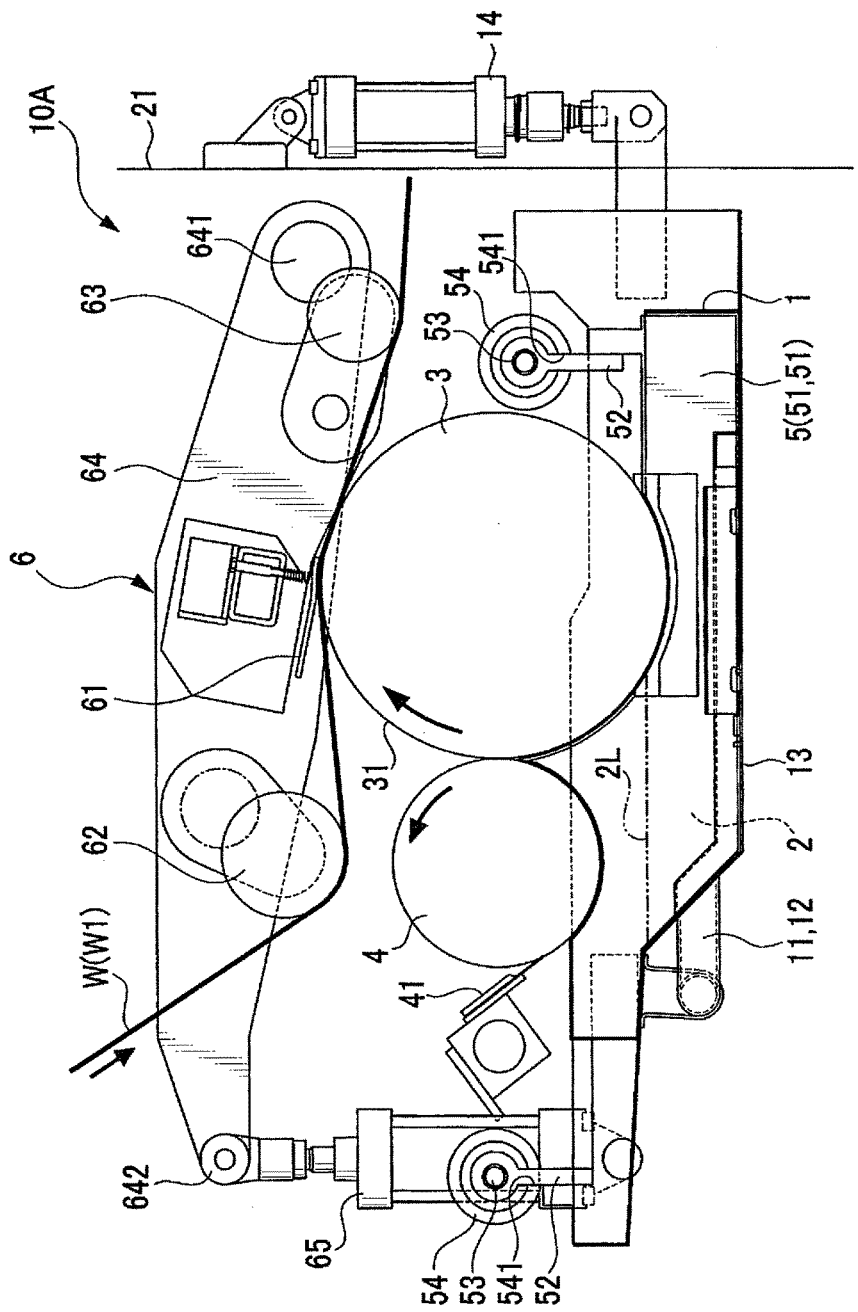
FIG. 2 is a side view illustrating the gluing device in FIG. 1.

As illustrated in FIG. 2, the gluing devices 10A comprises a reservoir tank 1, an applicator roll 3, a doctor roll 4, a pair of glue dams 5, and a contact member 6.

The reservoir tank 1 is a container capable of storing therein liquid glue 2 up to a given height indicated by the two-dot chain line 2L, and two glue supply pipes 11, 12 are connected to a bottom plate 13 to supply liquid glue 2 into the container. The two glue supply pipes 11, 12 are connected to the bottom plate 13 at a position on a center line CL of the reservoir tank 1 in a sheet feeding direction (machine direction), and a position outside one of widthwise opposite ends of the applicator roll 3. The reservoir tank 1 is coupled to a cylinder member 14 pivotally supported by the housing 21 and capable of being extended and retracted in an up-down direction. When the cylinder member 14 is extended, the reservoir tank 1 is moved downwardly to come away from the applicator roll 3 to thereby make it possible to perform maintenance work such as cleaning of the reservoir rank 1 and/or the applicator roll 3.

The applicator roll 3 is a cylindrical-shaped roll member for applying liquid glue 2 adhered to an outer peripheral surface 31 thereof, to flute tip regions of a corrugated medium W1 of a single-faced corrugated paperboard sheet W, and is disposed to extend in a width direction of the single-faced corrugated paperboard sheet W (in a front-back direction of the drawing sheet), in such a manner that the outer peripheral surface 31 is partially immersed in liquid glue 2 stored in the reservoir tank 1. The applicator roll 3 is configured to be rotated in a clockwise direction by a drive unit (not illustrated) fixed to a lateral end of the housing 21.

The doctor roll 4 is a cylindrical roll member for scraping a part of the liquid glue 2 adhered to the applicator roll 3 so as to adjust a coating thickness of the liquid glue 2 to become constant, and is disposed adjacent to and axially parallel to the applicator roll 3. The doctor roll 4 is configured to be rotated in a counterclockwise direction, following the applicator roll 3. The doctor roll 4 is provided with a scraper 41 for removing the liquid glue 2 adhered to an outer peripheral surface thereof.

The glue dams 5, 5 are a pair of sealing members for regulating a coating width of the liquid glue 2 to the applicator roll 3, and are disposed movably in a width direction of the applicator roll 3. The pair of glue dams 5, 5 are provided, respectively, at the widthwise opposite ends of the applicator roll 3, and each of them comprises two dam units 51, 51 (see FIG. 3). The two dam units 51, 51 are coupled, respectively, to two separate movable members 52, 52 of an aftermentioned moving mechanism 50. The movable members 52, 52 are formed to be engaged, respectively, with two separate screw drive shafts 53, 53, in such a manner as to be movable in the width direction of the applicator roll 3 according to rotation of the respective screw drive shafts 53, 53. The screw drive shafts 53, 53 are arranged with the applicator roll 3 and the doctor roll 4 interposed therebetween, and pivotally supported by two tubular-shaped guides 54, 54, respectively, and by the housing 21.

The contact member 6 is a guide member for causing a single-faced corrugated paperboard sheet W to come in to contact with the outer peripheral surface 31 of the applicator roll 3 with a given pressure, and is disposed just above the applicator roll 3. The contact member 6 comprises: a guide plate 61 which is elastically in contact with an upper surface of a single-faced corrugated paperboard sheet W; a support arm 64 having one end 641 pivotally supported by the housing 21 and swingably supporting the guide plate 61; two guide rolls 62, 63 disposed, respectively, on forward and rearward sides with respect to the guide plate 61 to cause the single-faced corrugated paperboard sheet W to travel along the outer peripheral surface 31 of the applicator roll 3; and a cylinder member 65 coupled to the other end 642 of the support arm 64. A rod of the cylinder member 65 can be extended to increase a gap between the applicator roll 3 and the guide plate 61 to thereby perform changeover between new and old production orders of single-faced corrugated paperboard sheets W.

<Detailed Structure of Glue Dam>

Figure 3:
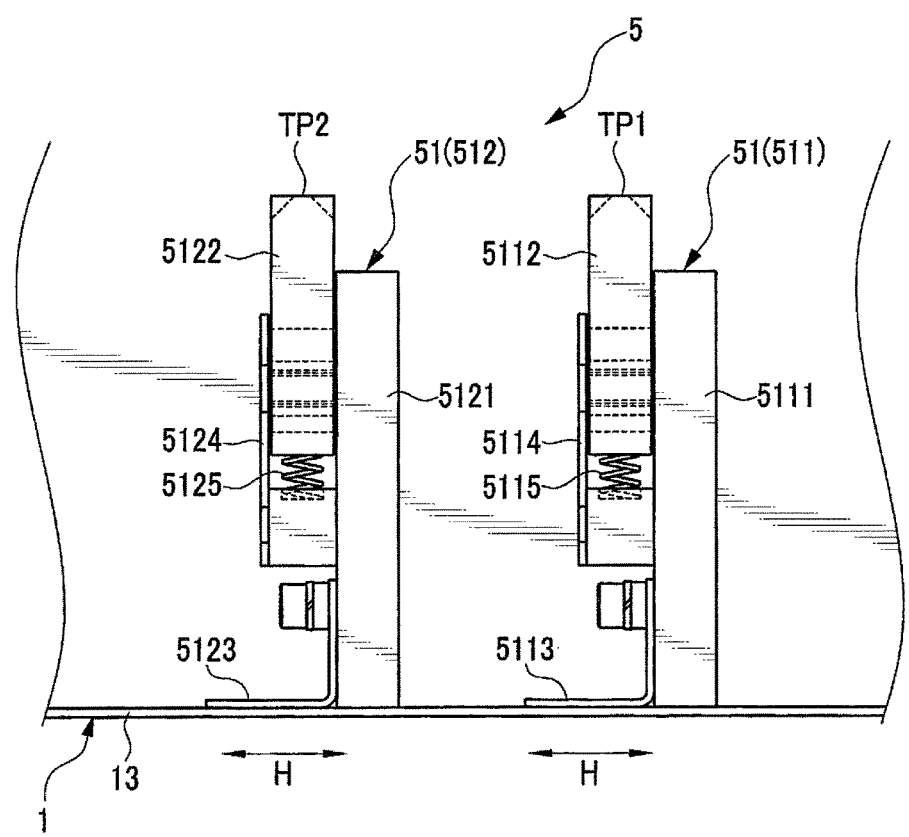
FIG. 3 is a front view illustrating dam units of the gluing device in FIG. 2.
Figure 4:
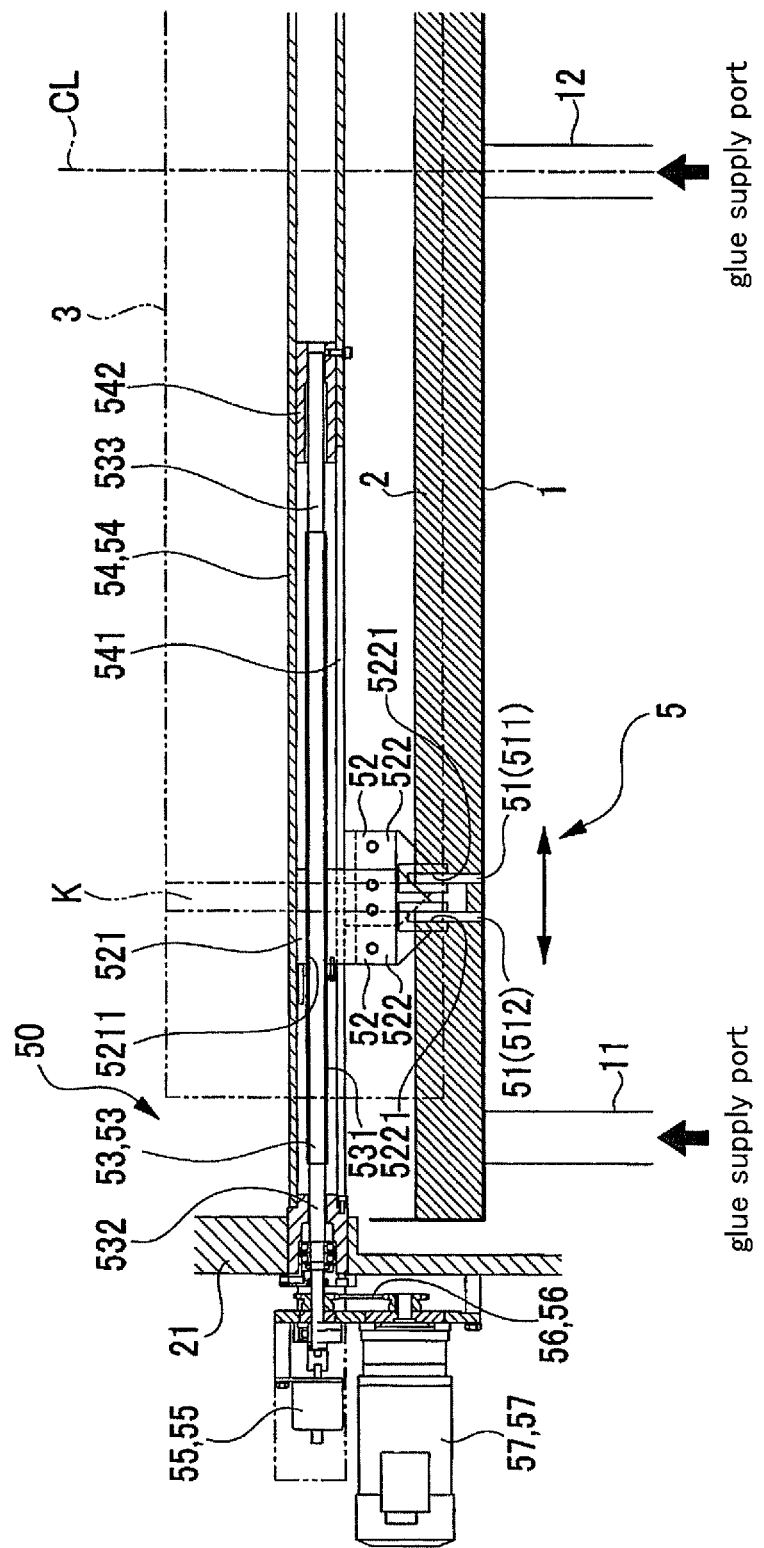
FIG. 4 is a sectional view illustrating a glue dam moving mechanism of the gluing device in FIG. 2.

Next, a detailed structure of the glue dam in the gluing device according to this embodiment will be described based on FIGS. 3 and 4. FIG. 3 is a front view illustrating the dam units of the gluing device in FIG. 2, and FIG. 4 is a sectional view illustrating a glue dam moving mechanism of the gluing device in FIG. 2.

As illustrated in FIG. 3, the two dam units 51, 51 (511, 512) of the glue dam 5 are disposed at respective positions spaced apart from each other in the width direction of the applicator roll 3. The dam units 51 consists of a first dam unit 511 disposed on the inner side of the applicator roll 3 along the width direction of the applicator roll 3, and a second dam unit 512 disposed on the outer side of the applicator roll 3 along the width direction of the applicator roll 3. Each of the first dam unit 511 and the second dam unit 512 comprises a dam body 5111, 5121, an upper sealing member 5112, 5122, a lower sealing member 5113, 5123, an upper sealing member-regulating plate 5114, 5124, and an upper sealing member-biasing spring 5115, 5125, and they are formed into the same size.

Each of the dam bodies 5111, 5121 is a damming plate for the liquid glue 2 stored in the reservoir tank 1, and is disposed along an inner wall of the reservoir tank 1. The dam bodies 5111, 5121 are coupled, respectively, to the separate movable members 52, 52 (see FIGS. 2 and 4), in such a manner as to be movable to an arbitrary in the width direction of the applicator roll 3 (direction indicated by the arrowed line N).

Each of the upper sealing members 5112, 5122 is configured to sealingly prevent the liquid glue 2 from adhering to the outer peripheral surface 31 of the applicator roll 3, and disposed along an upper region of a lateral wall of a corresponding one of the dam bodies 5111, 5121, slidably in an up-down direction. Each of the upper sealing members 5112, 5122 has an upper end (TP1, TP2) formed in an arc shape along the outer peripheral surface 31 of the applicator roll 3, in side view, and formed in a trapezoidal shape having a width which gradually decreases toward a distal end thereof, in front view, to thereby ensure an even contact with the outer peripheral surface 31 of the applicator roll 3 to enhance sealing performance. Preferably, each of the upper sealing members 5112, 5122 is made of a material having a relatively small frictional coefficient and excellent heat resistance, such as fluorine-based resin including polytetrafluoroethylene (PTFE).

Each of the lower sealing members 5113, 5123 is configured to prevent the liquid glue 2 stored in the reservoir tank 1 from entering into a space between the first dam unit 511 and the second dam unit 512, and fixed to a lower region of the lateral wall of a corresponding one of the dam bodies 5111, 5121. More specifically, each of the lower sealing members 5113, 5123 is a rubber plate member bent into an approximately L shape. A lower flat surface of the L-shaped lower sealing member is kept in surface contact with the bottom plate 13 of the reservoir tank 1 to enhance sealing performance.

Each of the upper sealing member-regulating plates 5114, 5124 is a regulatory member for allowing a corresponding one of the upper sealing members 5112, 5122 to be slidably moved in the up-down direction along a corresponding one of the dam bodies 5111, 5121. Each of the upper sealing member-biasing springs 5115, 5125 is a biasing member for pressing a lower end of a corresponding one of the upper sealing members 5112, 5122 to thereby allow the corresponding one of the upper sealing members 5112, 5122 to be kept in close contact with the outer peripheral surface 31 of the applicator roll 3, against vibration during rotation of the applicator roll 3.

As illustrated in FIG. 4, a moving mechanism 50 for the glue dam 5 comprises the pair of movable members 52, 52. The movable members 52, 52 are provided, respectively, on forward and rearward sides with respect to the applicator roll 3 and the doctor roll 4 (see FIG. 2). The moving mechanism 50 also comprises the screw drive shafts 53, 53, the tubular-shaped guides 54, 54, two pulse encoders 55, 55, two drive chains 56, 56 and two drive motors 57, 57. The movable mechanism 50 is provided symmetrically with respect to the center line CL in the sheet feeding direction.

As illustrated in FIGS. 2 and 4, the tubular-shaped guides 54, 54 are arranged with the applicator roll 3 and the doctor roll 4 interposed therebetween, and fixed to respective right and left lateral walls of the housing 21, and each of the movable members 52, 52 is formed to be movable along the slit grooves 541 formed in the tubular-shaped guides 54, 54. The slit grooves 541 are formed symmetrically with respect to the center line CL. The movable member 52 has a head 521 which is inserted in the tubular-shaped guide 54 and formed with a thread groove 5211 extending in the width direction of the applicator roll 3. The movable member 52 also has a leg 522 which is disposed to protrude downwardly from the slit groove 541 and formed with an engagement groove 5221 orthogonally engaged with a corresponding one of the first and second dam units 511, 512.

The screw drive shaft 53 has a central portion formed with a thread 531 engaged with the thread groove 5211. One 532 of opposite ends thereof is pivotally supported by a corresponding one of the lateral walls of the housing 21, and the other end 533 is supported by an intermediate support portion 542 of the tubular-shaped guide 54. The one end 532 of the screw drive shaft 53 is coupled to the drive motor 57 via the drive chain 56. The drive motor 57 is fixed to the corresponding lateral wall of the housing 21. The one end 532 of the screw drive shaft 53 is coupled to the pulse encoder 55 configured to output the number of rotations of the screw drive shaft 53. Based on an output signal of the pulse encoder 55, a movement distance of the movable member 52 is calculated.

As described in detail, when the drive chains 56, 56 are activated to rotate the screw drive shafts 53, 53 by a given number, the movable members 52, 52 can be moved by respective given distances to move the first dam unit 511 and the second dam unit 512 to respective arbitrary positions. This makes it possible to form, on the outer peripheral surface 31 of the applicator roll 3 at an arbitrary position and with an arbitrary width, a glue-uncoated region K which is interposed between the pair of dam units consisting of the first dam unit 511 and the second dam unit 512 so as to be kept from being adherently coated with the liquid glue 2.

<Relationship Between Corrugated Paperboard Sheet and Glue-Uncoated Region Formed on Applicator Roll>

Figure 5:
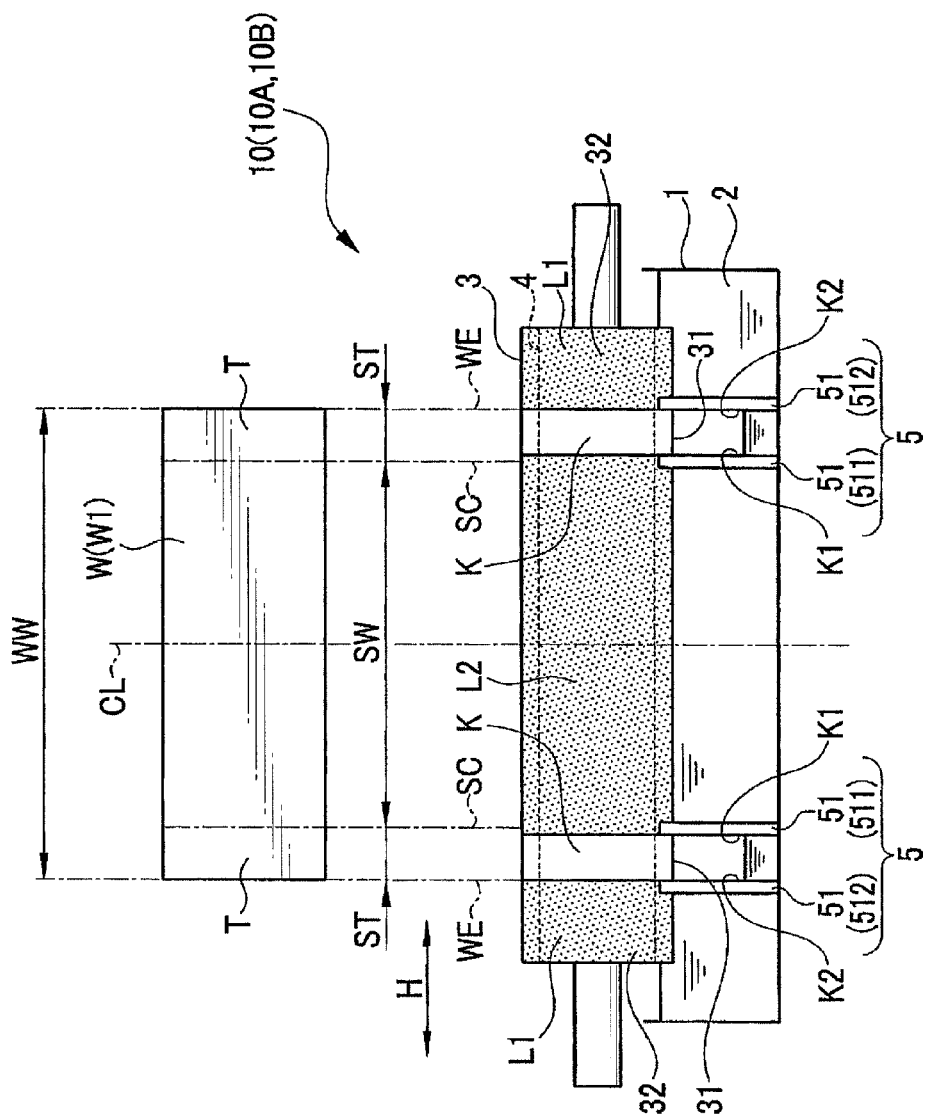
FIG. 5 is a schematic front view illustrating a relationship between a corrugated paperboard sheet and a glue-uncoated region formed on an applicator roll of the gluing device in FIG. 2 (example of wide trimming).
Figure 6:
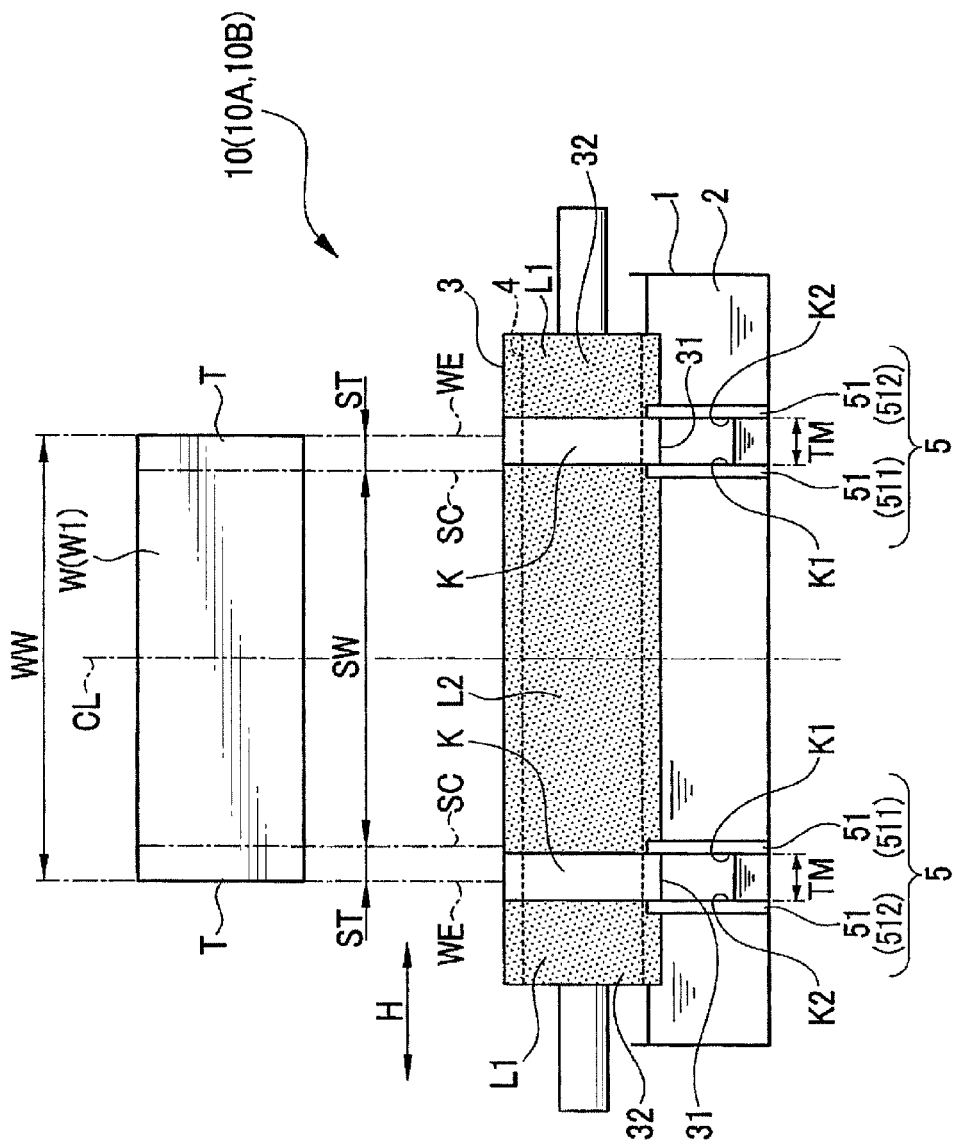
FIG. 6 is a schematic front view illustrating a relationship between a corrugated paperboard sheet and a glue-uncoated region formed on the applicator roll of the gluing device in FIG. 2 (example of regular trimming).
Figure 7:
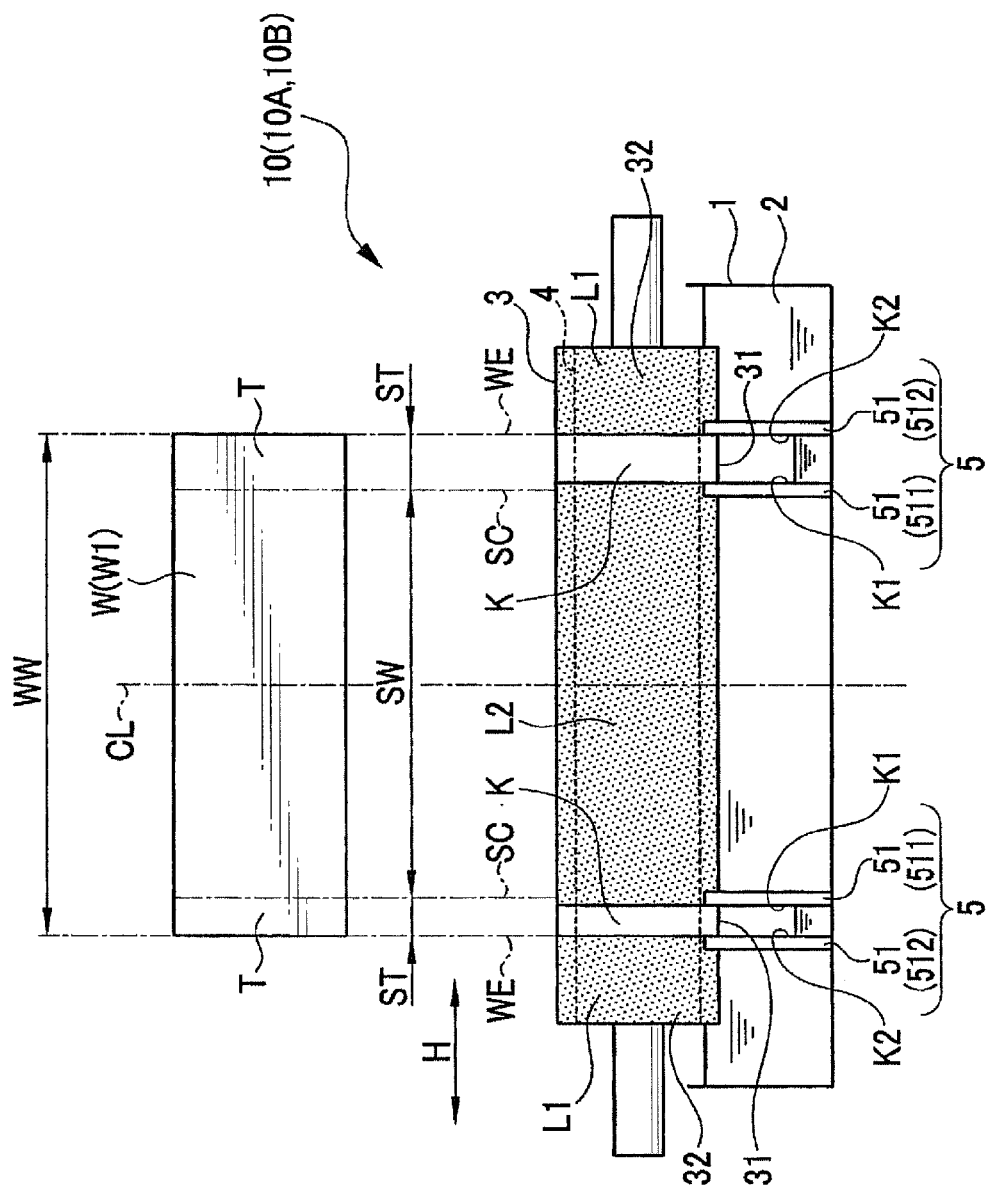
FIG. 7 is a schematic front view illustrating a relationship between a corrugated paperboard sheet and a glue-uncoated region formed on the applicator roll of the gluing device in FIG. 2 (example of asymmetric trimming).

Next, with respect to FIGS. 5 to 7, a relationship between a corrugated paperboard sheet and a glue-uncoated region formed on the applicator roll will be described. FIGS. 5 to 7 are schematic front views illustrating a relationship between a corrugated paperboard sheet and a glue-uncoated region formed on the applicator roll of the gluing device in FIG. 2. FIG. 5, FIG. 6 and FIG. 7 illustrate, respectively, an example of wide trimming, an example of regular trimming and an example of asymmetric trimming.

(Wide Trimming)

In wide trimming to be performed when a width dimension ST of a trimming region T formed along each of opposite edges of a corrugated paperboard sheet W is greater than a given trim width criterion value TL (see FIG. 10), as illustrated in FIG. 5, the first dam unit 511 is disposed correspondingly to a cut position SC along which the trimming region T of the corrugated paperboard sheet W is to be cut, and the second dam unit 512 is disposed correspondingly to a position of an original edge of a corrugated medium W1 of the corrugated paperboard sheet W. Thus, a glue-uncoated region K, which is interposed between the pair of dam units consisting of the first dam unit 511 and the second dam unit 512 so as to be kept from being adherently coated with the liquid glue 2, is formed on the outer peripheral surface 31 of the applicator roll 3, correspondingly to the trimming region T along each of the opposite edges of the corrugated paperboard sheet. Concurrently, on the remaining region of the outer peripheral surface 31 of the applicator roll 3 other than the glue-uncoated region, a glue-coated region L1 with liquid glue 2 adhered thereon is formed correspondingly to an outer area from an original corrugated paper board sheet, and a glue-coated region L2 with liquid glue 2 adhered thereon is formed correspondingly to a corrugated paperboard sheet W after the corrugated paper board W is cut so as to be formed as a product.

In this case, the first dam unit 511 is preferably disposed at a position where, even when a corrugated paperboard sheet W slightly meanders during traveling to a slitter apparatus disposed downstream of the gluing device, an edge region of the corrugated paperboard sheet after the edge region is cut by the slitter apparatus so as to be formed as a product is reliably glued, and a corrugated medium and a linerboard in a cut trimming strip is glued in a minimum extent that can prevent separation between the corrugated medium and the linerboard. For example, the first dam unit 511 is preferably disposed such that an outer sealing boundary line K1 of the first dam unit 511 is located outwardly in the width direction of the applicator roll 3, with respect to the cut position SC along which the trimming region T is to be cut, by about 3 to 7 mm (more preferably, about 5 mm).

The second dam unit 512 is disposed such that an inner sealing boundary line K2 of the second dam unit 512 is coincident with a position WE of an original edge of a corrugated medium W1 of a corrugated paperboard sheet W, because, even when glue remains on a widthwise outer region of a cut trimming strip to some extent due to slight meandering movement of the corrugated paperboard sheet W during traveling to the slitter apparatus disposed downstream of the gluing device, an influence on rigidity of the trimming strip is small.

On the other hand, in a situation where liquid glue 2 is applied around an original edge of a corrugated paperboard sheet W due to outward displacement of the original edge caused by relatively large meandering movement of the corrugated paperboard sheet W, resulting in significant adhesion of glue to a downstream-side heating plate 721, the second dam unit 512 may be disposed outwardly with respect to the original edge position WE by a certain distance. For example, the second dam unit 512 may be disposed such that the inner sealing boundary line K2 of the second dam unit 512 is located outward of the original edge position WE in the width direction of the applicator roll 3, by about 5 to 15 mm (more preferably, about 10 mm).

(Regular Trimming)

In regular trimming to be performed when a width dimension ST of a trimming region T formed along each of opposite edges of a corrugated paperboard sheet W is less than a given trim width criterion value TL (see FIG. 10), as illustrated in FIG. 6, the first dam unit 511 is disposed correspondingly to a cut position SC along which the trimming region T of the corrugated paperboard sheet W is to be cut, and the second dam unit 512 is disposed correspondingly to a minimum distance TM to which the second dam unit 512 is allowed to come close to the first dam unit 511. Specifically, a distance between an outer sealing boundary line K1 of the first dam unit 511 and an inner sealing boundary line K2 of the second dam unit 512 is identical to the minimum distance TM. Thus, a glue-uncoated region K, which is interposed between the pair of dam units consisting of the first dam unit 511 and the second dam unit 512 so as to be kept from being adherently coated with the liquid glue 2, is formed to have a width dimension greater than that of the trimming region T along each of the opposite edges of the corrugated paperboard sheet W. In this case, the glue-uncoated region K of the applicator roll 3 is limited to a minimum range in which the dam units are allowed to come close to each other, thereby avoiding firm adhesion of glue, while ensuring gluing of a corrugated paperboard sheet after the corrugated paperboard sheet is cut by a slitter apparatus so as to be formed as a product. In this case, on the outer peripheral surface 31 of the applicator roll 3, a glue-coated region L1 with liquid glue 2 adhered thereon is formed outside an original edge of the corrugated paperboard sheet, and a glue coated region L2 with liquid glue 2 adhered thereon is formed correspondingly to the corrugated paperboard sheet W after the corrugated paperboard sheet W is cut so as to be formed as a product, in the same manner as that in the case of wide trimming.

For example, the first dam unit 511 is preferably disposed such that an outer sealing boundary line K1 of the first dam unit 511 is located outwardly in the width direction of the applicator roll 3, with respect to the cut position SC along which the trimming region T is to be cut, by about 3 to 7 mm (more preferably, about 5 mm), as with the case of wide trimming.

(Asymmetric Trimming)

In asymmetric trimming to be performed when respective width dimensions ST of trimming regions T formed along opposite edges of a corrugated paperboard sheet W are asymmetric, as illustrated in FIG. 7, the glue dams 5 are arranged asymmetrically with respect to a center line CL of the corrugated paperboard sheet W in the sheet feeding direction. Thus, a glue-uncoated region K, which is interposed between the pair of dam units consisting of the first dam unit 511 and the second dam unit 512 so as to be kept from being adherently coated with the liquid glue 2, is formed correspondingly to the asymmetric trimming regions T. In this case, on the outer peripheral surface 31 of the applicator roll 3, a glue-coated region L1 with liquid glue 2 adhered thereon is formed outside an original edge of the corrugated paperboard sheet, and a glue coated region L2 with liquid glue 2 adhered thereon is formed correspondingly to a corrugated paperboard sheet W after the corrugated paperboard sheet W is cut so as to be formed as a product, in the same manner as that in the aforementioned cases.

For example, the first dam unit 511 is preferably disposed such that an outer sealing boundary line K1 of the first dam unit 511 is located outwardly in the width direction of the applicator roll 3, with respect to the cut position SC along which the trimming region T is to be cut, by about 3 to 7 mm (more preferably, about 5 mm), as with the case of wide trimming. Preferably, the second dam unit 512 is disposed such that an inner sealing boundary line K2 of the second dam unit 512 is coincident with a position WE of an original edge of a corrugated medium W1 of a corrugated paperboard sheet W.

<Details of Glue Dam Control>

Figure 8:
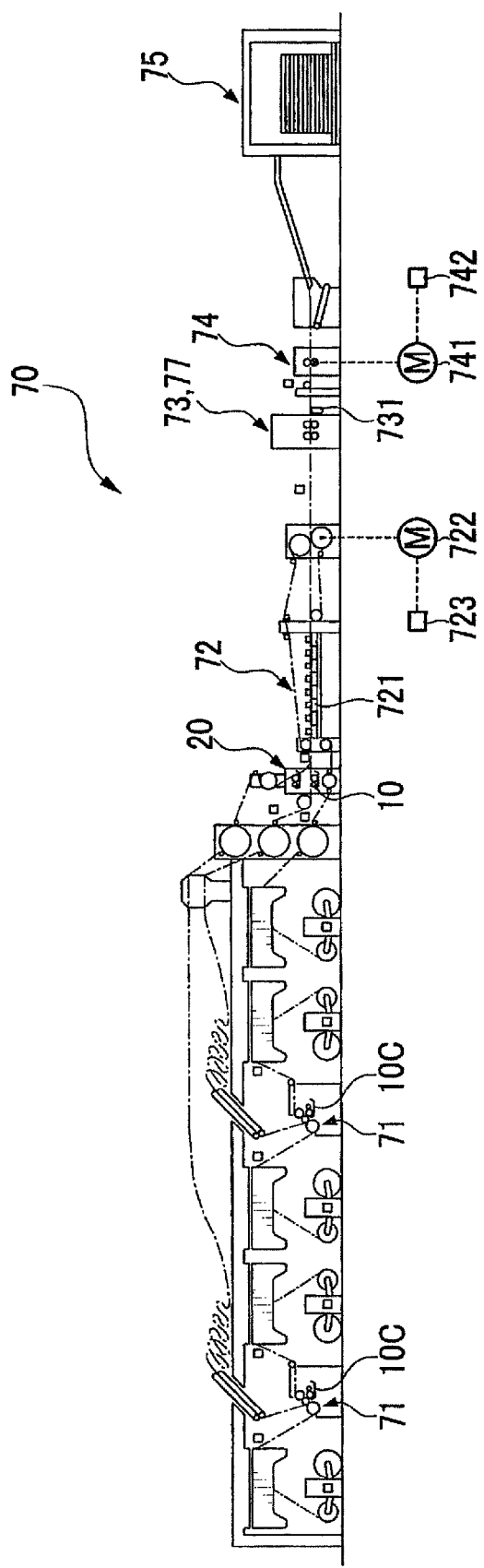
FIG. 8 is a side view illustrating a corrugating machine equipped with the gluing machine illustrated in FIG. 1.

Next, with reference to FIGS. 8 to 10, detail of glue dam control will be described in relation to a production management device of a corrugating machine. FIG. 8 is a side view illustrating a corrugating machine equipped with the gluing machine illustrated in FIG. 1, and FIG. 9 and FIG. 10 are, respectively, a control block diagram of the gluing machine illustrated in FIG. 8, and a flowchart illustrating details of glue dam control in the gluing device in FIG. 2.

As illustrated in FIG. 8, a corrugating machine 70 comprises a single facer 71, a gluing machine 20, a double facer 72, a slitter 73, a cutter 74 and a stacker 75, which are arranged in this order in a direction from an upstream side and a downstream side.

The gluing machine 20 is provided with the aforementioned gluing device 10. In the double facer 72, a plurality of heating plates 721 for heating and drying a glued corrugated paperboard sheet W are arranged in the sheet feeding direction. The double facer 72 has a drive motor 722 to which a sheet feeding distance detector (e.g., pulse encoder) 723 is installed. The slitter 73 is equipped with a suction duct 731 for suctioning and collecting cut trimming strips, on each of opposite sides of the dried corrugated paperboard sheet. The cutter 74 is equipped with a drive motor 741 for rotationally driving a knife cylinder, and a cutting detection device (e.g., pulse encoder) 742 installed in the drive motor 741. The single facer 71 is also equipped with a gluing device 10C. The slitter 73 is provided in combination with a scorer 77 (see FIG. 9).

Figure 9:
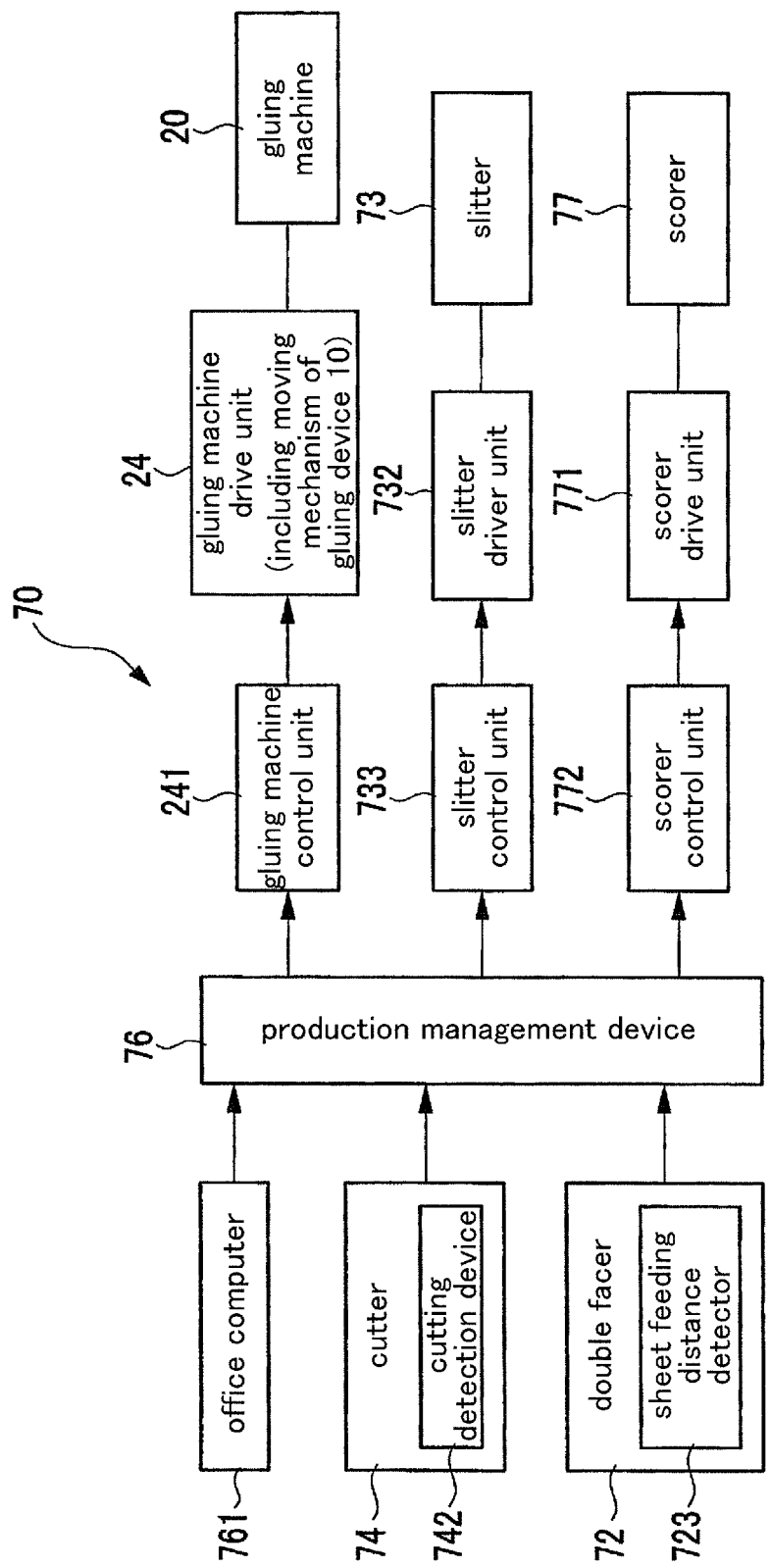
FIG. 9 is a control block diagram of the gluing machine illustrated in FIG. 8.
Figure 10:
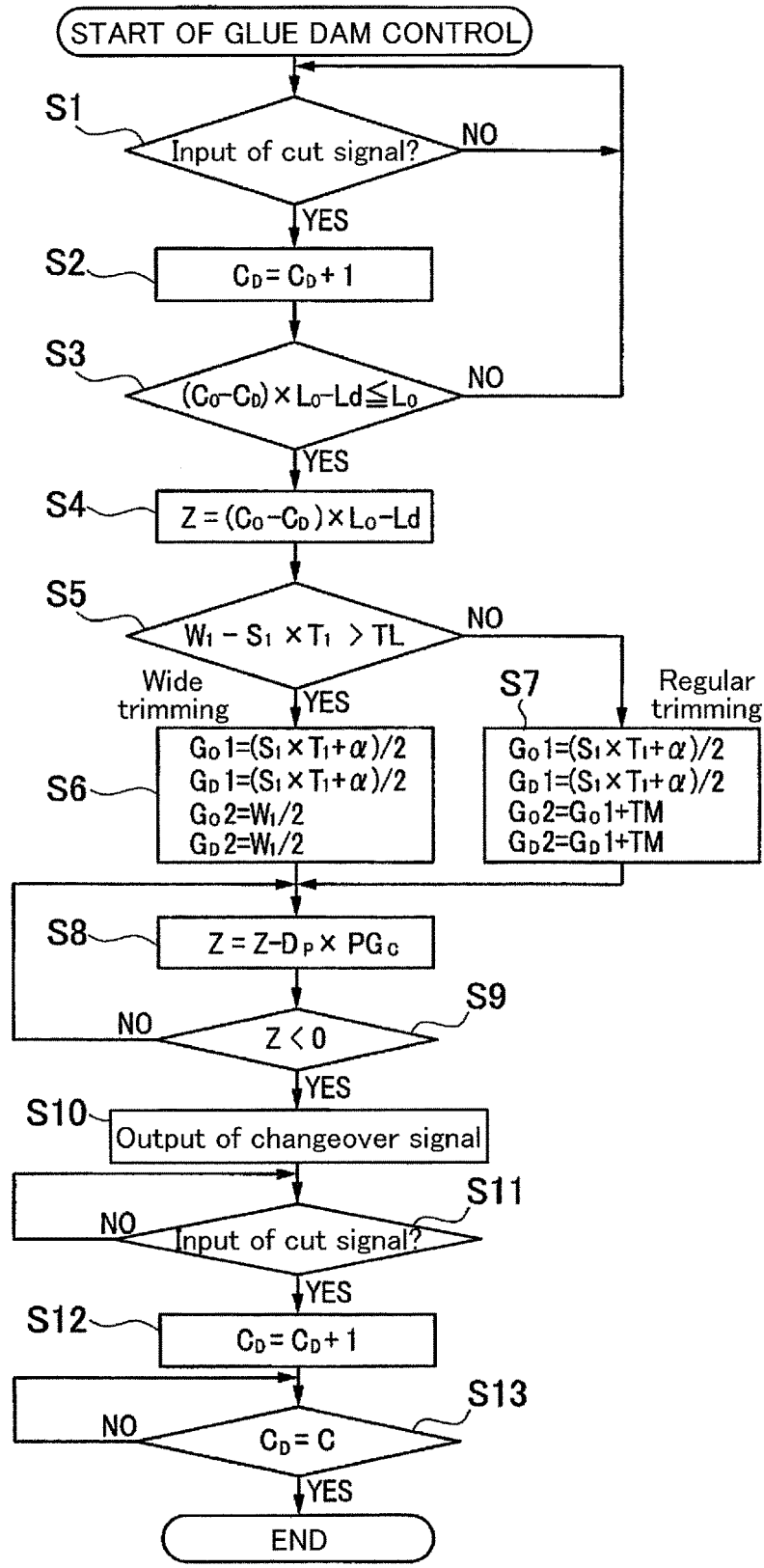
FIG. 10 is a flowchart illustrating details of glue dam control in the gluing device in FIG. 2.

As illustrated in FIG. 9, the corrugating machine 70 comprises a production management device 76 for automatically controlling the single facer 71, the gluing machine 20, the double facer 72, the slitter 73, the cutter 74, the stacker 75 and others, according to a production order. For example, the production management device 76 is electrically connected to a gluing machine control unit 241 for controlling a gluing machine drive unit (including the moving mechanism 50 of the gluing device 10) of the gluing machine 20. The production management device 76 is also electrically connected to a slitter control unit 733 for controlling a slitter driver unit 732 of the slitter 73, and a scorer control unit 772 for controlling a scorer drive unit 771 of the scorer 77. Further, the production management device 76 is configured to accept an input of a cutting signal from the cutting detection device 746 of the cutter 74, and an input of a feeding distance signal from the sheet feeding distance detector 723 of the double facer 72.

Further, the production management device 76 is electrically connected to an office computer 761 configured to accept an input of basic data about production orders and store therein the data. Examples of the basic data include: a sheet width $W_X$ of a corrugated paperboard sheet W; a slit width $S_X$; a width-span number $T_X$; a trim width criterion value TL; a cut instruction number C; a cut length $L_X$ of an order serial number X; a distance $L_d$ between the cutter 74 and the gluing machine 20; an already-executed cut number $C_D$ in a current order; a feeding distance count Z; a first dam unit position (operation side) $G_O 1$; a first dam unit position (drive side) $G_D 1$; a second dam unit position (operation side) $G_O 2$; a second dam unit position (drive side) $G_D 2$; an inter-dam unit minimum distance TM; a per-count feeding distance $D_P$ of the sheet feeding distance detector 723; and a count variation $PG_C$ of the sheet feeding distance detector 723. In the following description, the subscript $_X$ denotes an order series number, and the subscript $_0$ and the subscript $_1$ denote a current order and a next order, respectively.

As illustrated in FIG. 10, the flowchart of glue dam control comprises Steps S1 to S13.

Upon start of the glue dam control, in the Step S1, the production management device 76 checks whether or not the cut signal has been newly input from the cutting detection device 742 of the cutter 74. When the cut signal has been newly input, the production management device 76 adds 1 to an already-executed cut number $C_D$ in a current order, in the Step S2, and then determines whether or not a value derived by subtracting a distance $L_d$ between the cutter 74 and the gluing machine 20 from a product of a remaining cut number $(C_0 - C_D)$ in the current order and a cut length $L_0$ in the current order is equal to or less than the cut length $L_0$ in the current order. When the determination is made as YES, the control routine advances to the next Step S4, wherein the production management device 76 recognizes the value derived by subtracting the distance $L_d$ between the cutter 74 and the gluing machine 20 from the product of the remaining cut number $(C_0 - C_D)$ in the current order and the cut length $L_0$ in the current order, as a feeding distance count Z. On the other hand, when the determination in the Step S3 is made as NO, the production management device 76 will repeat the Steps S1 and S2.

Then, in the Step S5, in the next order, the production management device 76 determines whether or not a value derived by subtracting a product of a slit width $S_1$ and a width-span number $T_1$ from a sheet width $W_1$ is greater than a predetermined trim width criterion value TL. When the determination is made as YES, a process is judged to be wide trimming. Thus, in the Step S6, in response to receiving a signal indicative of the YES from the production management device 76, the gluing machine control unit 241 operates to set positions to which the first dam units and the second dam units should be moved individually for the next order, in the following manner. A first dam unit position (operation side) $G_O 1$ and a first dam unit position (drive side) $G_D 1$ are set to respective positions spaced away from the center line CL in the sheet feeding direction by a value of one-half of a value derived by adding an allowance value α to the product of the slit width $S_1$ and the width-span number $T_1$ in the next order. Further, a second dam unit position (operation side) $G_O 2$ and a second dam unit position (drive side) $G_D 2$ are set to respective positions spaced away from the center line CL in the sheet feeding direction by a value of one-half of the sheet width $W_1$ in the next order.

Then, in the Step S5, in the next order, the production management device 76 determines whether or not a value derived by subtracting a product of a slit width $S_1$ and a width-span number $T_1$ from a sheet width $W_1$ is greater than a predetermined trim width criterion value TL. When the determination is made as YES, a process is judged to be wide trimming. Thus, in the Step S6, in response to receiving a signal indicative of the YES from the production management device 76, the gluing machine control unit 241 operates to set positions to which the first dam units and the second dam units should be moved individually for the next order, in the following manner. A first dam unit position (operation side) $G_O 1$ and a first dam unit position (drive side) $G_D 1$ are set to respective positions spaced away from the center line CL in the sheet feeding direction by a value of one-half of a value derived by adding an allowance value α to the product of the slit width $S_1$ and the width-span number $T_1$ in the next order. Further, a second dam unit position (operation side) $G_O 2$ and a second dam unit position (drive side) $G_D 2$ are set to respective positions spaced away from the center line CL in the sheet feeding direction by a value of one-half of the sheet width $W_1$ in the next order.

The allowance value α is a width dimension for absorbing a meandering movement of a corrugated paperboard sheet W in the sheet feeding direction. More specifically, the allowance value α is set to allow each of the first dam units to be disposed at a position where, even when an original corrugated paperboard sheet W slightly meanders during traveling to the slitter 73 disposed downstream of the gluing device, an edge region of a corrugated paperboard sheet after the corrugated paperboard sheet is cut by the slitter 73 so as to be formed as a product is reliably glued, and a corrugated medium W1 and a linerboard W2 in a cut trimming strip is glued in a minimum extent that can prevent separation between the corrugated medium W1 and the linerboard W2. The allowance value α is preferably in the range of about 3 to 7 mm (more preferably, about 5 mm).

On the other hand, when the determination in the Step S5 is made as NO, a process is judged to be regular trimming. Thus, in the Step S7, in response to receiving a signal indicative of the NO from the production management device 76, the gluing machine control unit 241 operates to set positions to which the first dam units and the second dam units should be moved individually for the next order, in the following manner. The first dam unit position (operation side) $G_O1$ and the first dam unit position (drive side) $G_D1$ are set to respective positions spaced away from the center line CL in the sheet feeding direction by a value of one-half of a value derived by adding an allowance value α to the product of the slit width $S_1$ and the width-span number $T_1$ in the next order. Further, the second dam unit position (operation side) $G_O2$ and the second dam unit position (drive side) $G_D2$ are set to respective positions spaced away from the center line CL in the sheet feeding direction, respectively, by a value derived by adding an inter-dam unit minimum distance TM to the first dam unit position (operation side) $G_O1$ and a value derived by adding the inter-dam unit minimum distance TM to the first dam unit position (drive side) $G_D1$. The allowance value α is the same as that set in the Step S6.

Then, in the Step S8, the production management device 76 recognizes a value derived by subtracting a product of a per-count feeding distance $D_P$ of the sheet feeding distance detector 723 and a count variation $PG_C$ of the sheet feeding distance detector 723, from the feeding distance count Z recognized in the Step S4, as a new feeding distance count Z. Then, in the Step S9, the production management device 76 determines whether or not the new feeding distance count Z is less than zero. When the determination is made as YES, in the Step S10, the production management device 76 outputs a changeover signal P to the gluing machine control unit 241, so that the moving mechanism 50 of the gluing device 10 included in the gluing machine drive unit 24 moves the first dam units and the second dam units to the respective positions set in the Step S6 or S7. When the determination is made as NO, the production management device 76 will repeat the Step S8.

Then, in the Step S11, the production management device 76 checks whether or not the cut signal has been newly input from the cutting detection device 742 of the cutter 74. When the cut signal has been newly input, the production management device 76 adds 1 to an already-executed cut number $C_D$ in the current order, in the Step S12, and then determines whether or not the already-executed cut number $C_D$ in the current order is coincident to a cut instruction number C in the current order. When the determination is made as YES, the glue dam control is terminated. On the other hand, when the determination is made as NO, the production management device 76 will repeat the Step S13.

As described in detail above, positions of the glue dams 5, 5 in the width direction of the gluing roll 3 are controlled according to a production order to the corrugating machine 70. This makes it possible to minimize line stopping during changeover of production order to the corrugating machine 70, while preventing wasteful use of the liquid glue and adhesion of glue to a downstream-side heating plate, and easily collecting and treating trimming strips in opposite edge regions of a corrugated paperboard sheet.

<Functions and Effects in Embodiment>

As described in detail above, in the gluing device 10 according to this embodiment, each of the glue dams 5 provided on respective sides of widthwise opposite ends of the applicator roll 3 comprises the two dam units 51 (the first dam unit 511 and the second dam unit 512) located in spaced-apart relation to each other in the width direction of the applicator roll 3, wherein the dam units 51 are configured to form a glue-uncoated region K which is interposed between the two dam units so as to be kept from being adherently coated with liquid glue 2, on the outer peripheral surface 31 of the applicator roll 3, correspondingly to a trimming region T along each of opposite edges of a corrugated paperboard sheet, so that an amount of the liquid glue 2 to be applied to the trimming regions T can be reduced or minimized. In addition, the glue-uncoated region K is formed while being interposed between the two dam units, so that sealability between the outer peripheral surface 32 of the applicator roll 3 and each of the dam units 51, 51 is enhanced, and it becomes easier to prevent the glue-uncoated region K from being adherently coated with the liquid glue 2. This makes it possible to prevent wasteful use of the liquid glue 2 and adhesion of glue to the downstream-side heating plate 721.

Further, the glue-uncoated region K is formed correspondingly to the trimming regions T along the respective opposite edges of the corrugated paperboard sheet, to reduce or minimize the amount of the liquid glue 2 to be applied to the trimming regions T, so that it becomes possible to reduce or limit a bonding area between the corrugated medium W1 and the linerboard W2 in the trimming regions T, to the minimum. Therefore, rigidity of trimming strips trimmed by the slitter 73 disposed downstream of the gluing device in the sheet feeding direction is reduced. This makes it possible to more easily suck and collect the trimming strips by the suction duct 731, and reduce the occurrence of an undesirable situation where the trimming strips are entangle with each other around the inlet of the suction duct 731, causing jamming-up.

On the other hand, the liquid glue 2 adheres to and coats a region (L1, L2) of the outer peripheral surface 31 of the applicator roll 3 other than the glue-uncoated region in the width direction of the applicator roll 3. Thus, for example, even in the case where a narrow-type corrugated paperboard sheet W is continuously produced, it becomes possible to reduce the occurrence of an undesirable situation where the adhered liquid glue 2 at the opposite ends 32 of the applicator roll 3 is dried and firmly adhered to the surface of the applicator roll 3. This makes it possible to perform uniform glue application even when a wide-type corrugated paperboard sheet W necessary to use approximately the entire width of the applicator roll 3 is subsequently produced.

As above, it becomes possible to provide a gluing device 10 capable of preventing wasteful use of the liquid glue 2 and adhesion of glue to the downstream-side heating plate 721, while reducing firm adhesion of glue to the applicator roll 3, and easily collecting and treating trimming strips in the opposite edge regions of the corrugated paperboard sheet.

In the above embodiment, each of the glue dams 5 comprises the two movable members 52, 52 each movable in the width direction of the applicator roll 3, wherein the two dam units 51, 51 (the first dam unit 511 and the second dam unit 512) are coupled, respectively, to the movable members. Thus, the glue-uncoated region K of the applicator roll 3 which is interposed between the two dam units so as to be kept from being adherently coated with the liquid glue 2 is shifted to an arbitrary position in the width direction of the applicator roll 3. Therefore, when a cut width SW of a corrugated paperboard sheet W is changed correspondingly to a production order, a position and a width of the glue-uncoated region K can be adjusted correspondingly to new trimming regions T, only by moving the movable members 52, 52 to respective position corresponding to a new cut width.

This makes it possible to cope with a change in cut width of the corrugated paperboard sheet W according to a production order, in addition to the advantage of being able to prevent wasteful use of the liquid glue 2 and adhesion of glue to the downstream-side heating plate 721, while reducing firm adhesion of glue to the applicator roll 3, and easily collect and treat trimming strips in the opposite edge regions of the corrugated paperboard sheet.

In the above embodiment, the two dam units 51 consist of the first dam unit 511 disposed on the inner side of the applicator roll 3 along the width direction of the applicator roll 3, and the second dam unit disposed on the outer side of the applicator roll 3 in the width direction of the applicator roll 4, wherein the first dam unit 511 is disposed correspondingly to a cut position SC along which the trimming region T of the corrugated paperboard sheet W is to be cut, and the second dam unit 512 is disposed correspondingly to a position WE of an original edge of the corrugated medium W1 of the corrugated paperboard sheet W. Thus, a width dimension of the glue-uncoated region K can be adjusted correspondingly to a width dimension ST of the trimming regions T along the respective opposite edges of the corrugated paperboard sheet. Therefore, it becomes possible to minimize an amount of the liquid glue 2 to be applied to the trimming regions T to thereby further reliably prevent wasteful use of the liquid glue 2 and adhesion of glue to the downstream-side heating plate 721.

In addition, the minimization of the amount of the liquid glue 2 to be applied to the trimming regions T allows the bonding area between the corrugated medium W1 and the linerboard W2 in the trimming regions T to be limited to the minimum. Therefore, rigidity of the trimming strips is significantly reduced, so that it becomes possible to further reduce the occurrence of the undesirable situation where the trimming strips are entangle with each other around the inlet of the suction duct 731, causing jamming-up.

This makes it possible to reliably prevent wasteful use of the liquid glue 2 and adhesion of glue to the downstream-side heating plate 721, and easily collect and treat the trimming strips in the opposite edge regions of the corrugated paperboard sheet.

In the above embodiment, the two dam units 51 consist of the first dam unit 511 disposed on the inner side of the applicator roll 3 along the width direction of the applicator roll 3, and the second dam unit 512 disposed on the outer side of the applicator roll 3 in the width direction of the applicator roll 3, wherein, when f one-half of a value derived by subtracting the cut width SW of the corrugated paperboard sheet W from an original width WW of the corrugated medium W1 of the corrugated paperboard sheet W is less than a given value, the first dam unit Sills disposed correspondingly to the cut position SC along which the trimming region T of the corrugated paperboard sheet W is to be cut, and the second dam unit 512 is disposed correspondingly to a minimum distance TM to which the second dam unit 512 is allowed to come close to the first dam unit 511. Thus, the glue-uncoated region K of the applicator roll 3 is limited to a minimum range in which the two dam units are allowed to come close to each other, thereby avoiding the firm adhesion of glue, while ensuring gluing of a corrugated paperboard sheet to be formed as a product. This makes it possible to prevent wasteful use of the liquid glue 2 and adhesion of glue to the downstream-side heating plate 721, to the minimum extent.

In addition, this arrangement is taken when on-half of the value derived by subtracting the cut width SW of the corrugated paperboard sheet W from the original width WW of the corrugated medium W1 of the corrugated paperboard sheet W is less than a given trim width criterion value TL, so that the width dimension ST of the trimming region T is equal to or less than the minimum distance to which the two dam units are allowed to come close to each other, and thus the liquid glue 2 is adhered only around a cut edge of each of the trimming strips in the range of an allowance value α. Thus, it becomes possible to relatively reduce the occurrence of an undesirable situation where the trimming strips are entangle with each other around the inlet of the suction duct 731, causing jamming-up.

As above, it becomes possible to prevent wasteful use of the liquid glue 2 and adhesion of glue to the downstream-side heating plate 721, and easily collect and treat the trimming strips in the opposite edge regions of the corrugated paperboard sheet.

In the above embodiment, the gluing device 10 is provided in the gluing machine 20, wherein each of the two movable members 52 coupled, respectively, to the first dam unit 511 and the second dam unit 512, is configured to be moved based on a changeover signal P output from the production management device 72 of the corrugating machine 70 comprising the gluing machine 20. Thus, position control of the first dam unit 511 and the second dam unit 512 can be performed interlockingly with a production order for corrugated paperboard sheets W set up in the corrugating machine 70. Thus, it becomes possible to move the first dam unit 511 and the second dam unit 512 to respective adequate positions in synchronization with a timing of changeover of production order.

This makes it possible to minimize line stopping during changeover of production order to the corrugating machine 70, while preventing wasteful use of the liquid glue 2 and adhesion of glue to the downstream-side heating plate 721, and easily collecting and treating the trimming strips in the opposite edge regions of the corrugated paperboard sheet.

In the above embodiment, the glue dams 5 are disposed in asymmetric relation with respect to a center line CL of the corrugated paperboard sheet W in the sheet feeding direction, so that, even when the trimming regions T along the opposite edges of the corrugated paperboard sheet are cut in an asymmetric manner, the glue-uncoated region K can be formed correspondingly to the asymmetric trimming regions T. Thus, a width dimension of the glue-uncoated region K can be adjusted correspondingly to a width dimension of the asymmetric trimming regions along the opposite edges of the corrugated paperboard sheet.

This makes it possible to minimize the amount of the liquid glue 2 to be applied to the trimming regions T, even to the asymmetric trimming regions T, thereby further reliably preventing wasteful use of the liquid glue and adhesion of glue to the downstream-side heating plate 721.

<Modifications>

The above embodiment may be variously modified.

(1) In the above embodiment, each of the glue dams 5 comprises the two movable members 52, 52 each movable in the width direction of the applicator roll 3, wherein the two dam units 51 (the first dam unit 511 and the second dam unit 512) are coupled to the movable members, respectively. However, the present invention is not necessarily limited thereto.

Figure 11:
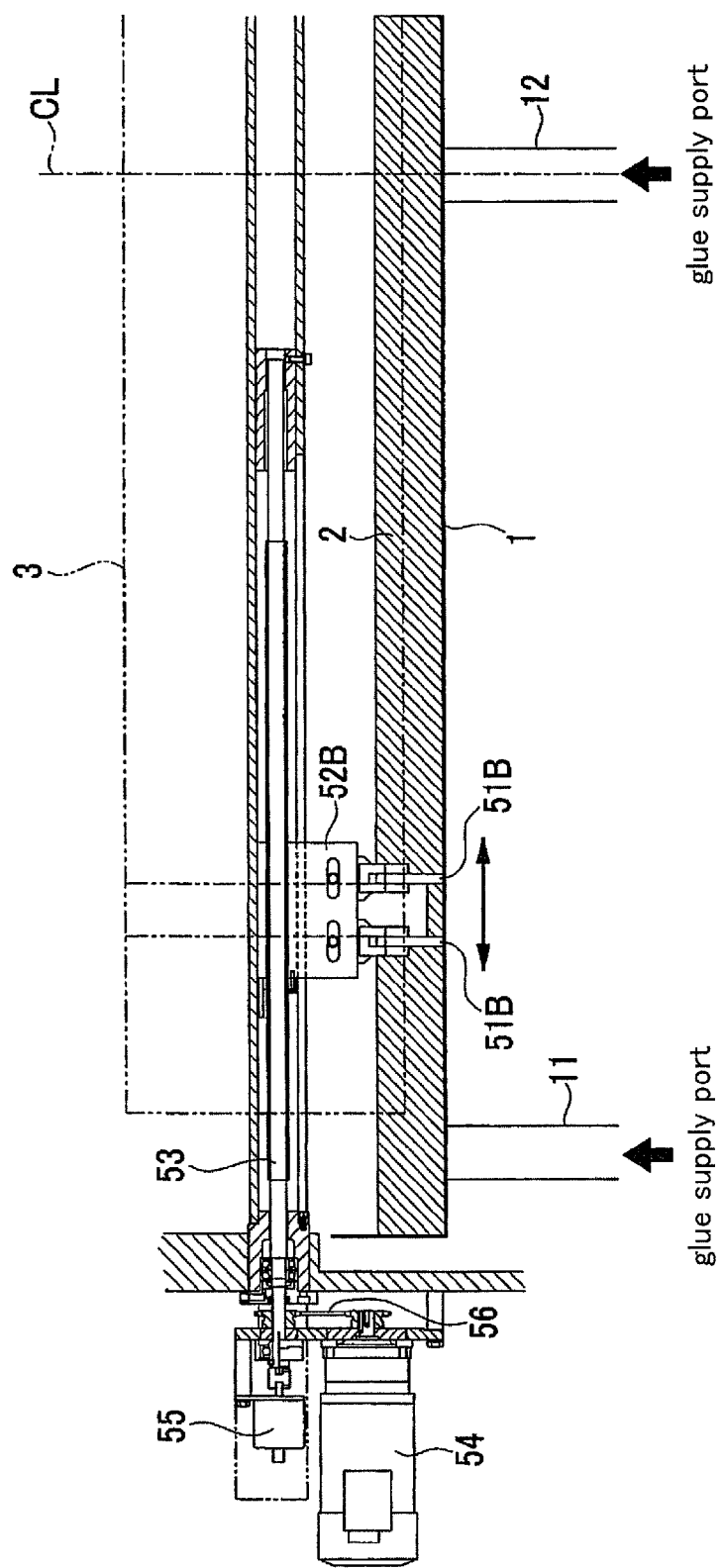
FIG. 11 is a front view illustrating one modification of the glue dam moving mechanism of the gluing device in FIG. 4.
Figure 12:
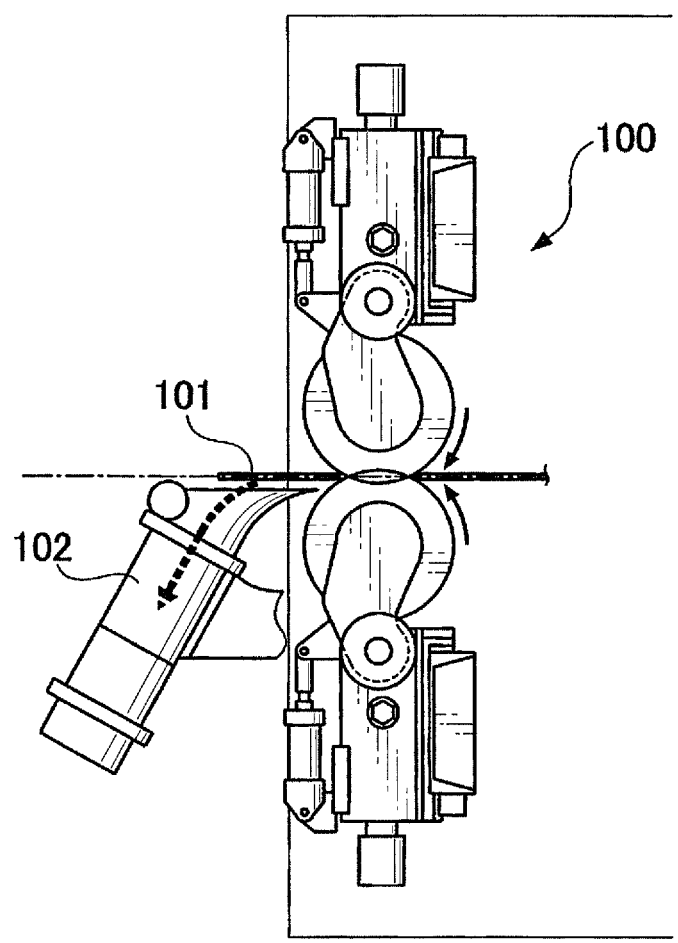
FIG. 12 is a side view illustrating a conventional slitter apparatus.

For example, as illustrated in FIG. 11, each of the glue dams 5 may comprise one movable member 52B movable in the width direction of the applicator roll 3, and two dam units 51B may be coupled to the movable member. In this case, the glue-uncoated region K of the applicator roll 2 which is interposed between the two dam units 51B, 51B so as to be kept from being adherently coated with the liquid glue 2 can be shifted to an arbitrary position in the width direction of the applicator roll 3. Thus, when the cut position SC of the corrugated paperboard sheet W is changed correspondingly to a production order, the glue-uncoated region K can be adjusted correspondingly to new trimming regions T, only by moving the inner movable member 52B to a position corresponding to a new cut position. This makes it possible to cope with a change in cut position of the corrugated paperboard sheet W according to a production order, in addition to the advantage of being able to prevent wasteful use of the liquid glue 2 and adhesion of glue to the downstream-side heating plate 721, while reducing firm adhesion of glue to the applicator roll 3, and easily collect and treat trimming strips in the opposite edge regions of the corrugated paperboard sheet.

Preferably, at least an outer one of the two dam units 51B, 51B is coupled to the movable member 52B in such a manner as to be movable the with respect to the movable member 52B in the width direction of the applicator roll 3. This is because, in the case where the cut width SW of the corrugated paperboard sheet W is largely changed correspondingly to a production order, a distance between the dam units 51B, 51B can be largely changed, following the change in cut width of the corrugated paperboard sheet.

(2) In the above embodiment, the gluing device 10 is provided in the gluing machine 20. However, the present invention is not necessarily limited thereto.

For example, the gluing device 10 may be used as the gluing device 10C of the single facer 71 illustrated in FIG. 8.

What is claimed is:

1. A gluing device comprising: a reservoir tank storing therein liquid glue; an applicator roll partially immersed in the liquid glue stored in the reservoir tank; a doctor roll for adjusting a thickness of the liquid glue adhered to the applicator roll to become uniform; and a pair of glue dams for regulating a width of the liquid glue adherable to the applicator roll, the gluing device being configured to apply the adhered liquid glue on the applicator roll to a corrugated medium of a corrugated paperboard sheet, wherein each of the glue dams comprises a pair of dam units located in spaced-apart relation to each other in a width direction of the applicator roll, and wherein the pair of dam units are configured to form a glue-uncoated region interposed between the pair of dam units on an outer peripheral surface of the applicator roll so as to correspond to a trimming region along each of opposite edges of the corrugated paperboard sheet.

2. The gluing device according to claim 1, wherein each of the glue dams comprises a movable member movable in the width direction of the applicator roll, and the pair of dam units are coupled to the movable member.

3. The gluing device according to claim 1, wherein each of the glue dams comprises a pair of movable members each movable in the width direction of the applicator roll, and the pair of dam units are coupled to the pair of movable members, respectively.

4. The gluing device according to claim 3, wherein the pair of dam units in each of the glue dams consist of a first dam unit disposed on an inner side of the applicator roll along the width direction of the applicator roll, and a second dam unit disposed on an outer side of the applicator roll along the width direction of the applicator roll, and wherein the first dam unit is disposed so as to correspond to a cut position along which the trimming region of the corrugated paperboard sheet is to be cut, and the second dam unit is disposed so as to correspond to a position of an original edge of the corrugated medium of the corrugated paperboard sheet.

5. The gluing device according to claim 4, wherein the gluing device is provided in a gluing machine, and each of the pair of movable members in each of the glue dams is configured to move a respective one of the first dam unit and the second dam unit, based on a changeover signal output from a production management device of a corrugating machine comprising the gluing machine.

6. The gluing device according to claim 3, wherein the pair of dam units in each of the glue dams consist of a first dam unit disposed on an inner side of the applicator roll along the width direction of the applicator roll, and a second dam unit disposed on an outer side of the applicator roll along the width direction of the applicator roll, and wherein, when a value derived by subtracting a cut width of the corrugated paperboard sheet from an original width of the corrugated medium of the corrugated paperboard sheet is less than a given value, the first dam unit is disposed so as to correspond to a cut position along which the trimming region of the corrugated paperboard sheet is to be cut, and the second dam unit is disposed so as to correspond to a minimum distance to which the second dam unit is allowed to come close to the first dam unit.

7. The gluing device according to claim 6, wherein the gluing device is provided in a gluing machine, and each of the pair of movable members in each of the glue dams is configured to move a respective one of the first dam unit and the second dam unit, based on a changeover signal output from a production management device of a corrugating machine comprising the gluing machine.

8. The gluing device according to claim 1, wherein the glue dams are disposed in asymmetric relation with respect to a center line of the corrugated paperboard sheet in a sheet feeding direction.

* * * * *